United States Patent
Al Badrashiny et al.

(10) Patent No.: US 8,577,898 B2
(45) Date of Patent: *Nov. 5, 2013

(54) SYSTEM AND METHOD FOR RATING A WRITTEN DOCUMENT

(75) Inventors: Mohammed A. Al Badrashiny, Riyadh (SA); Mansour M. Alghamdi, Riyadh (SA); Abdulaziz S. Alharbi, Riyadh (SA); Mohamed I. Alkanhal, Riyadh (SA); Abdulaziz O. Al-Qabbany, Riyadh (SA); Naif A. Alrajhi, Riyadh (SA); Ali M. Areshey, Riyadh (SA)

(73) Assignee: King Abdulaziz City for Science and Technology, Riyadh (SA)

( * ) Notice: Subject to any disclaimer, the term of this patent is extended or adjusted under 35 U.S.C. 154(b) by 0 days.

This patent is subject to a terminal disclaimer.

(21) Appl. No.: 13/546,611

(22) Filed: Jul. 11, 2012

(65) Prior Publication Data

US 2012/0276505 A1 Nov. 1, 2012

Related U.S. Application Data

(63) Continuation of application No. 12/953,840, filed on Nov. 24, 2010, now Pat. No. 8,301,640.

(51) Int. Cl.
*G06F 17/30* (2006.01)
(52) U.S. Cl.
USPC ............ 707/748; 707/690; 704/1; 434/155; 434/156; 434/322
(58) Field of Classification Search
USPC ......... 707/690, 748, 999.2; 704/1, 2, 8, 9, 10; 434/155, 156, 322
See application file for complete search history.

(56) References Cited

U.S. PATENT DOCUMENTS

| | | | | |
|---|---|---|---|---|
| 7,720,675 B2 * | 5/2010 | Burstein et al. | ............ | 704/9 |
| 8,185,378 B2 * | 5/2012 | Burstein et al. | ............ | 704/9 |
| 8,202,098 B2 * | 6/2012 | Attali | ............ | 434/322 |
| 2002/0055940 A1 * | 5/2002 | Elkan | ............ | 707/104.1 |
| 2005/0142529 A1 * | 6/2005 | Andreyev et al. | ............ | 434/362 |
| 2005/0143971 A1 * | 6/2005 | Burstein et al. | ............ | 704/4 |
| 2006/0078863 A1 * | 4/2006 | Coleman et al. | ............ | 434/322 |
| 2006/0194183 A1 * | 8/2006 | Attali | ............ | 434/322 |
| 2006/0240390 A1 * | 10/2006 | Attali | ............ | 434/156 |
| 2007/0276653 A1 * | 11/2007 | Greenwald et al. | ............ | 704/10 |
| 2009/0226872 A1 * | 9/2009 | Gunther | ............ | 434/350 |
| 2010/0297596 A1 * | 11/2010 | Burstein et al. | ............ | 434/322 |
| 2011/0313757 A1 * | 12/2011 | Hoover et al. | ............ | 704/9 |

OTHER PUBLICATIONS

Foltz, "Automated Essay Scoring . . . Technology", Interactive Multimedia Electronic Journal of Computer-Enhanced Learning, 2003, pp. 1-7.

(Continued)

*Primary Examiner* — Dennis Truong
(74) *Attorney, Agent, or Firm* — Andrew M. Calderon; Roberts Mlotkowski Safran & Cole, P.C.

(57) ABSTRACT

A system and method for rating an essay writing using a statistical system so it can be applied on any language with very few changes. The system comprising multiple modules capable of providing a style score, a punctuation score, a spelling score, a quotation score, an enrichment score, a syntax analysis score, a focus score, an idea score and a cohesion score. The scores are then combined to provide a final overall rating of the essay.

20 Claims, 14 Drawing Sheets

(56) References Cited

OTHER PUBLICATIONS

Williams, "Automated essay grading: . . . models", Teaching and Learning conference (2001), URL: http://lsn.curtin.edu.au/tlf/tlf2001/williams.html, pp. 1-8.

Kakkonen et al., "Automatic Assessment of . . . Materials", IEEE Information Technology: Research and Education, 2003, pp. 500-504.

Wiemer-Hastings et al., "Rules for Syntax, Vectors for Semantics", Iin Proc. 23rd annual Conf. of the Cognitive Science Society. Mawhwah, N.J. Erlbaum. 2001 (6 pages).

Kanejiya et al., "Automatic Evaluation of . . . LSA", Proc. of the HLT-NAACL 2003 Workshop, pp. 1-8. Association of Computational Linguistics. 2003.

Kakkonen et al., "Automatic Essay Grading with . . . Analysis", Proc. of 2nd Workshop on Bldg. Education Appl. Using NLP, pp. 29-36, Ann Arbor, Jun. 2005.

Pearson, "Intelligent Essay Assessor", 2010, URL: http://www.pearsonkt.com/prodIEA.shtml, 1 page.

PaperRater, "About Paper Rater", 2010, URL: http://paperrater.com/about, 2 pages.

Vantage Learning, "At School: IntelliMetric", Downloaded Nov. 23, 2010 URL: http://www.vantagelearning.com/achool/products/intellimetric, 1 page.

ETS, "Automated Scoring Capabilities", Downloaded Nov. 23, 2010, pp. 1-5 URL: http://www.ets.org/research/capabilities/automated_scoring.

Shermis et al., "Automated Essay Scoring . . . A Cross-Disciplinary Perspective", 2003, pp. 87-109. http://books.google.com/books?id=7wuXGNb9bgEC&1pg=PA87&ots=eKbpYNWzOJ&dq=1sa%20in%20automatic%20essay%20scoring&1r=&pg=PA90#v=onepage&q=Isa%20in%20automatic%20essay%20scoring&f=false.

* cited by examiner

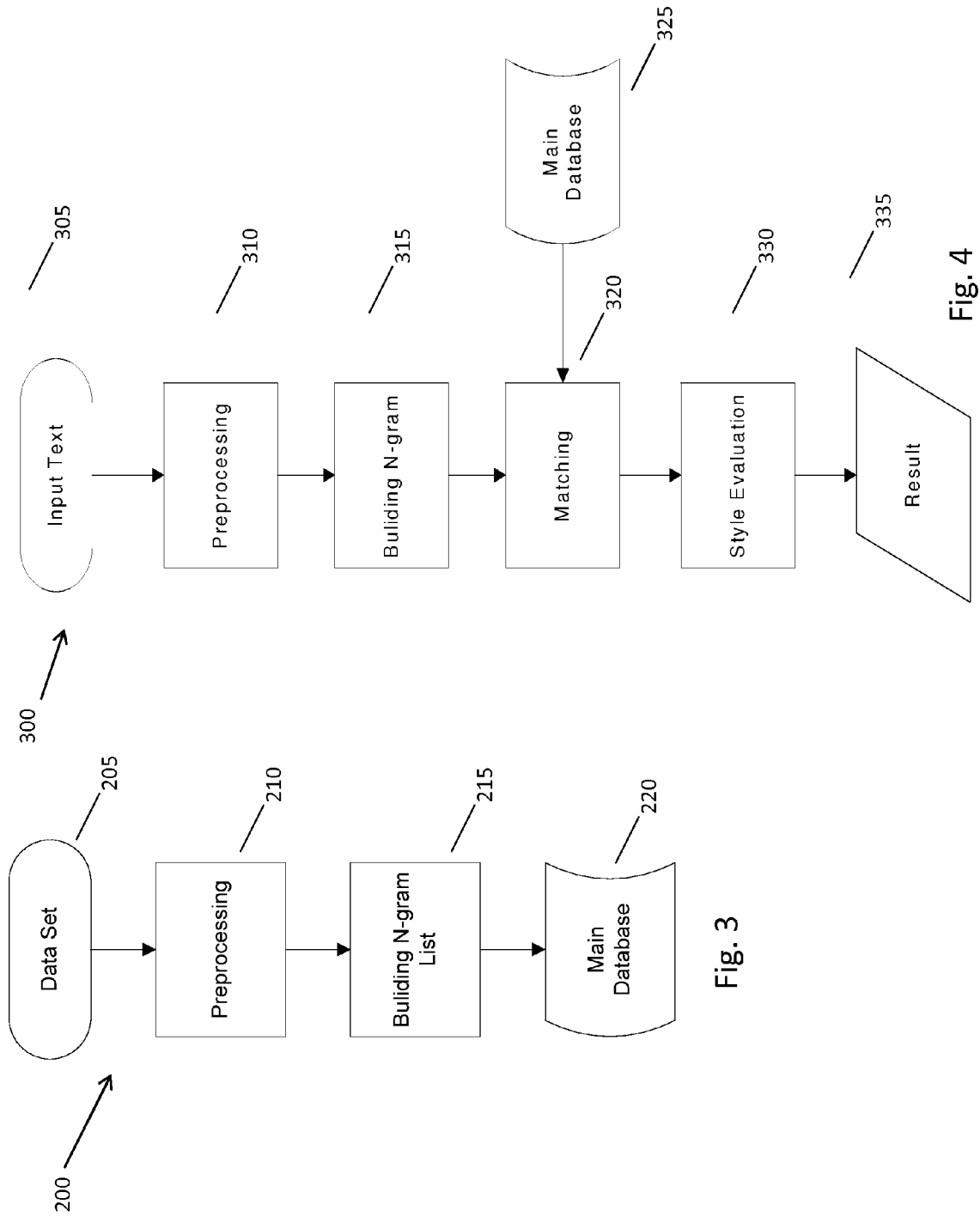

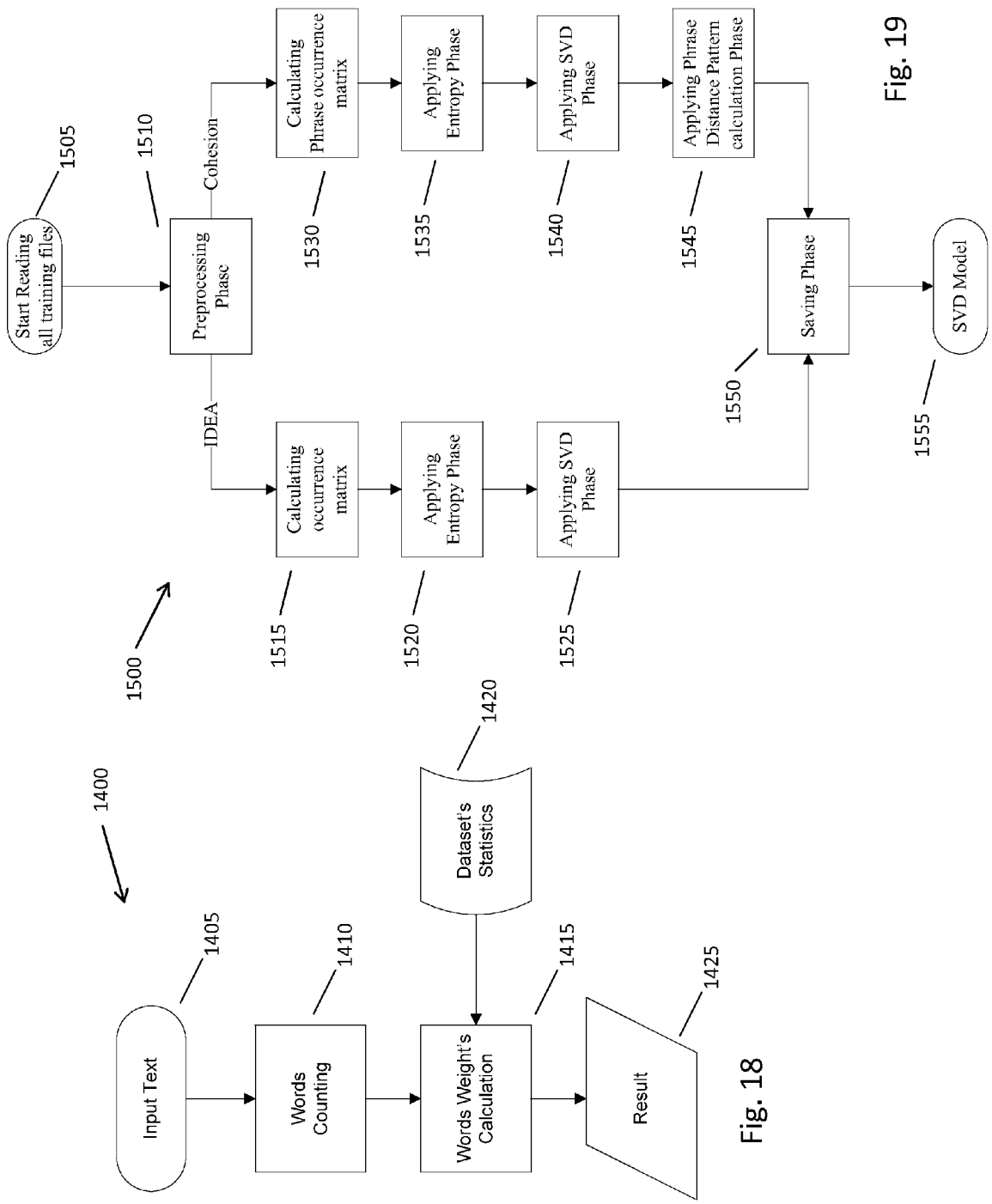

SYSTEM AND METHOD FOR RATING A WRITTEN DOCUMENT

CROSS REFERENCE TO RELATED APPLICATION

This application is a continuation application of U.S. application Ser. No. 12/953,840, filed on Nov. 24, 2010, the contents of which are incorporated by reference in their entirety herein.

FIELD OF THE INVENTION

The invention generally relates to systems and methods for the evaluation of essay writings, and in particular, a system and method for rating an essay writing using a statistical system so it can be applied on any language with very few changes.

BACKGROUND

Essay writing is a significant element for expressing oneself and an important indicator of linguistic competency and knowledge of an author. In particular, essays are considered by many researchers as the most useful tool to assess learning outcomes, implying the ability to recall, organize and integrate ideas, the ability to express oneself in writing and the ability to supply merely than identify interpretation and application of data. It is no wonder that essay writing has been an important subject in the educational system across cultures and throughout history. However, manual evaluation of essay writing faces several obstacles including the time and effort it takes to evaluate an essay and the inconsistency among human raters.

For example, one of the several obstacles of manually grading essays is represented by the perceived subjectivity of the grading process. The subjective nature of an essay assessment leads to variation in grades awarded by different human assessors, which is perceived by students as a great source of unfairness. This issue may be faced through the adoption of automated assessment tools for essays. A system for automated assessment would at least be consistent in the way it scores essays, and enormous cost and time savings could be achieved if the system can be shown to grade essays within the range of those awarded by human assessors. Therefore, the efficiency of a system for automated assessment holds a strong appeal to institutions of higher education.

Accordingly, there exists a need in the art to overcome the deficiencies and limitations described hereinabove.

SUMMARY

In a first aspect of the invention, a system for rating an input document comprises a CPU, a computer readable memory and a computer readable storage media. The system further comprises first program instructions to provide a style score based on how a language style of an input document is different from at least one training document. The system further comprises second program instructions to provide a punctuation score based on a comparison between use of punctuation marks in the input document and the use of punctuation marks in the at least one training document. The system further comprises third program instructions to provide a spelling score based on spelling accuracy of the input document. The system further comprises fourth program instructions to provide a quotation score based on a comparison between sentences from the input document and sentences from the at least one training document. The system further comprises fifth program instructions to provide an enrichment score based on new and accurate vocabularies used in the input document. The system further comprises sixth program instructions to provide a syntax analysis score based on grammar mistakes in the input document. The system further comprises seventh program instructions to provide a focus score based on a topic of the input document and a focus of the input document on that topic. The system further comprises eighth program instructions to provide an idea and cohesion score based on whether the input document provides a close or far away cohesive correct answer. The system further comprises ninth program instructions to provide the rating of the input document based on the style score, the punctuation score, the spelling score, the quotation score, the enrichment score, the syntax analysis score, the focus score, the idea score and the cohesion score. The first-ninth program instructions are stored on the computer readable storage media for execution by the CPU via the computer readable memory.

In a another aspect of the invention, a method for rating a writing comprises providing a style score based on how a language style of the writing is different from at least one training document. The method further comprises providing a punctuation score based on a comparison between the use of punctuation marks in the writing and the use of punctuation marks in the at least one training document. The method further comprises providing a spelling score based on spelling accuracy of the writing. The method further comprises providing a quotation score based on a comparison between sentences from the writing and the sentences from the at least one training document. The method further comprises providing an enrichment score based on new and accurate vocabularies used in the writing. The method further comprises providing a syntax analysis score based on grammar mistakes in the writing. The method further comprises providing a focus score based on a topic of the writing and a focus of the writing on that topic. The method further comprises providing an idea and cohesion score based on whether the writing provides a close or far away cohesive correct answer. The method further comprises providing a rating of the writing based on the style score, the punctuation score, the spelling score, the quotation score, the enrichment score, the syntax analysis score, the focus score, the idea score and the cohesion score.

In another aspect of the invention, a computer program product comprises at least one component operable to provide a style score based on how a language style of the input document is different from at least one training document. The at least one component further operable to provide a punctuation score based on a comparison between the use of punctuation marks in the input document and the use of punctuation marks in the at least one training document. The at least one component further operable to provide a spelling score based on spelling accuracy of the input document. The at least one component further operable to provide a quotation score based on a comparison between sentences from the input document and the sentences from the at least one training document. The at least one component further operable to provide an enrichment score based on new and accurate vocabularies used in the input document. The at least one component further operable to provide a syntax analysis score based on grammar mistakes in the input document. The at least one component further operable to provide a focus score based on a topic of the input document and a focus of the input document on that topic. The at least one component further operable to provide an idea and cohesion score based on whether the input document provides a close or far away cohesive correct answer. The at least one component further operable to provide a rating of the input document based on the style score, the punctuation score, the spelling score, the quotation score, the enrichment score, the syntax analysis score, the focus score, the idea score and the cohesion score.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 3 is a flow diagram of a plagiarism training phase in accordance with aspects of the invention;

FIG. 4 is a flow diagram of a plagiarism testing phase in accordance with aspects of the invention;

FIG. 18 is a flow diagram of a testing phase of a domain classifier and focus scorer process in accordance with aspects of the invention;

FIG. 19 is a flow diagram of a training phase of an idea and cohesion scorer process in accordance with aspects of the invention.

DETAILED DESCRIPTION OF THE INVENTION

Figure 1:
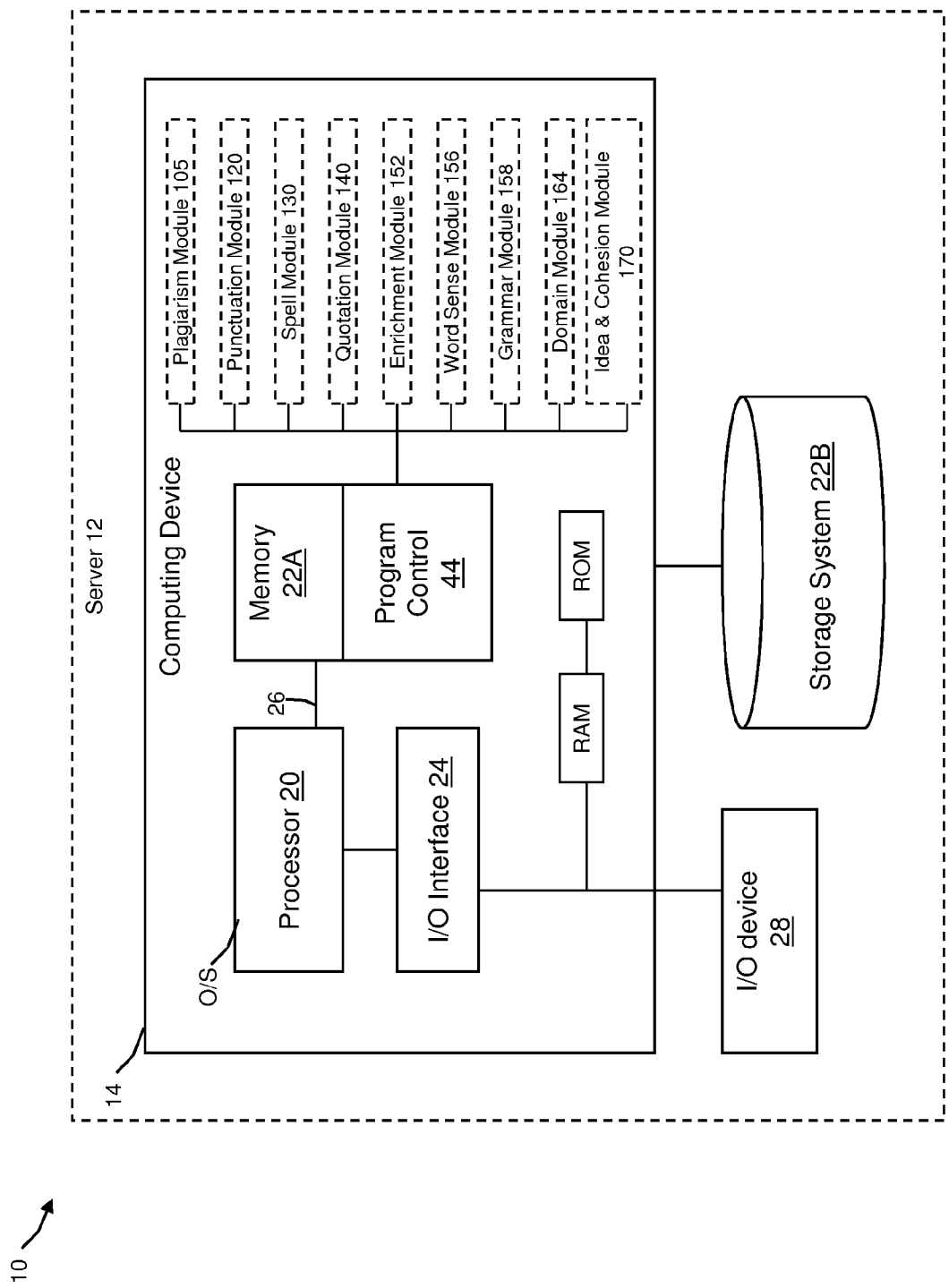
FIG. 1 is an illustrative external environment for implementing the invention in accordance with aspects of the invention.

The invention generally relates to systems and methods for the evaluation of essay writings (e.g., also referred to generally as an input document and input text), and in particular, a system and method for rating an essay writing using a statistical system so it can be applied on any language with very few changes. More specifically, the invention relates to an automated essay rater (hereinafter referred to as the "Abbir system") and, more particularly, to an automated essay rater with a plurality of modules that can be implemented on any language since it is a fully statistical system. Additionally and advantageously, Abbir system (1) is fast because it is fully statistical without any rule based component, (2) is capable of working on Arabic, (3) has a plurality of types of scoring providing a more detailed score to a user, (4) uses stemmed words which lead to fast machine learning (e.g., decreasing the training corpus size), (5) applies a novel technique for coherence, (6) corrects misspelled words automatically in order to separate each type of mistakes, (7) uses methods to find the words' synonyms to increase the overall system accuracy, (8) uses a syntax analyzer to find accuracy for each phrase in the document, (9) uses the complete document in the training phase in order to let the computer understand the whole document instead of understanding each phrase alone, and (10) uses pre-scored documents for training, which can be for example documents collected from real life exams from universities or other learning institutions.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage of expression having computer-usable program code embodied in the medium. The computer-usable or computer-readable medium may be any medium that can contain, store, or communicate, for use by or in connection with the instruction execution system, apparatus, or device. The computer-usable or computer-readable medium may be, for example, an electronic, magnetic, optical, electromagnetic, infrared, or semiconductor system, apparatus, or device.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

FIG. 1 shows an illustrative environment 10 for managing the processes in accordance with the invention. The environment 10 includes a server or other computing system 12 that can perform the processes described herein. The server 12 includes a computing device 14 which can be resident on a network infrastructure or computing device. The computing device 14 includes a processor 20, memory 22A, an I/O interface 24, and a bus 26. In addition, the computing device includes random access memory (RAM), a read-only memory (ROM), and an operating system (O/S).

The computing device 14 is in communication with the external I/O device/resource 28 and the storage system 22B. The I/O device 28 can comprise any device that enables an individual to interact with the computing device 14 (e.g., user interface) or any device that enables the computing device 14 to communicate with one or more other computing devices using any type of communications link.

The processor 20 executes computer program code (e.g., program control 44), which can be stored in the memory 22A and/or storage system 22B. While executing the computer program code, the processor 20 can read and/or write data to/from memory 22A, storage system 22B, and/or I/O interface 24. The program code executes the processes of the invention such as, for example, translating a text-based command assigned to a service command configured to control a service, into the service command, as will be discussed below.

The computing device 14 includes a plagiarism module 105, a punctuation module 120, a spell module 130, a quotation module 140, an enrichment module 152, a word sense module 156, a grammar module 158, a domain module 164, and idea and cohesion module 170 that may be a portion of the computer program code. Alternatively, the plagiarism module 105, punctuation module 120, spell module 130, quotation module 140, enrichment module 152, word sense module 156, grammar module 158, domain module 164, and idea and cohesion module 170 may be located in computer program code of another computing device. By way of non-limiting example, the a plagiarism module 105, punctuation module 120, spell module 130, quotation module 140, enrichment module 152, word sense module 156, grammar module 158, domain module 164, and idea and cohesion module 170 can be located on a client device, a third-party service provider, or a public or private server. Further for example, the plagiarism module 105, punctuation module 120, spell module 130, quotation module 140, enrichment module 152, word sense module 156, grammar module 158, domain module 164, and idea and cohesion module 170 can be implemented as the following:
- a Graphical User Interface (GUI) application in a client device that can translate GUI commands into text-based commands;
- a standalone application in a client device;
- a gadget on a computer desktop or in a web site;
- a web site;
- an instant messaging client that communicates directly with a system server;
- an instant messaging web-based client that communicates directly with a system server;
- a Wireless Access Point (WAP) interface;
- an e-mail interface; and/or
- a Really Simple Syndication (RSS) interface.

The plagiarism module 105, punctuation module 120, spell module 130, quotation module 140, enrichment module 152, word sense module 156, grammar module 158, domain module 164, and idea and cohesion module 170 perform the processes of the invention such as, for instance, implementing essay analysis to provide individual scores that can be combined to provide a final essay rating, as described in detail below, and each can be its own dedicated special processor or combination thereof.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Flow Diagram

FIGS. 2-7, 9-12 and 15-20 show an exemplary flow for performing aspects of the present invention. The steps of FIGS. 2-7, 9-12 and 15-20 may be implemented in the environment of FIG. 1, for example. The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
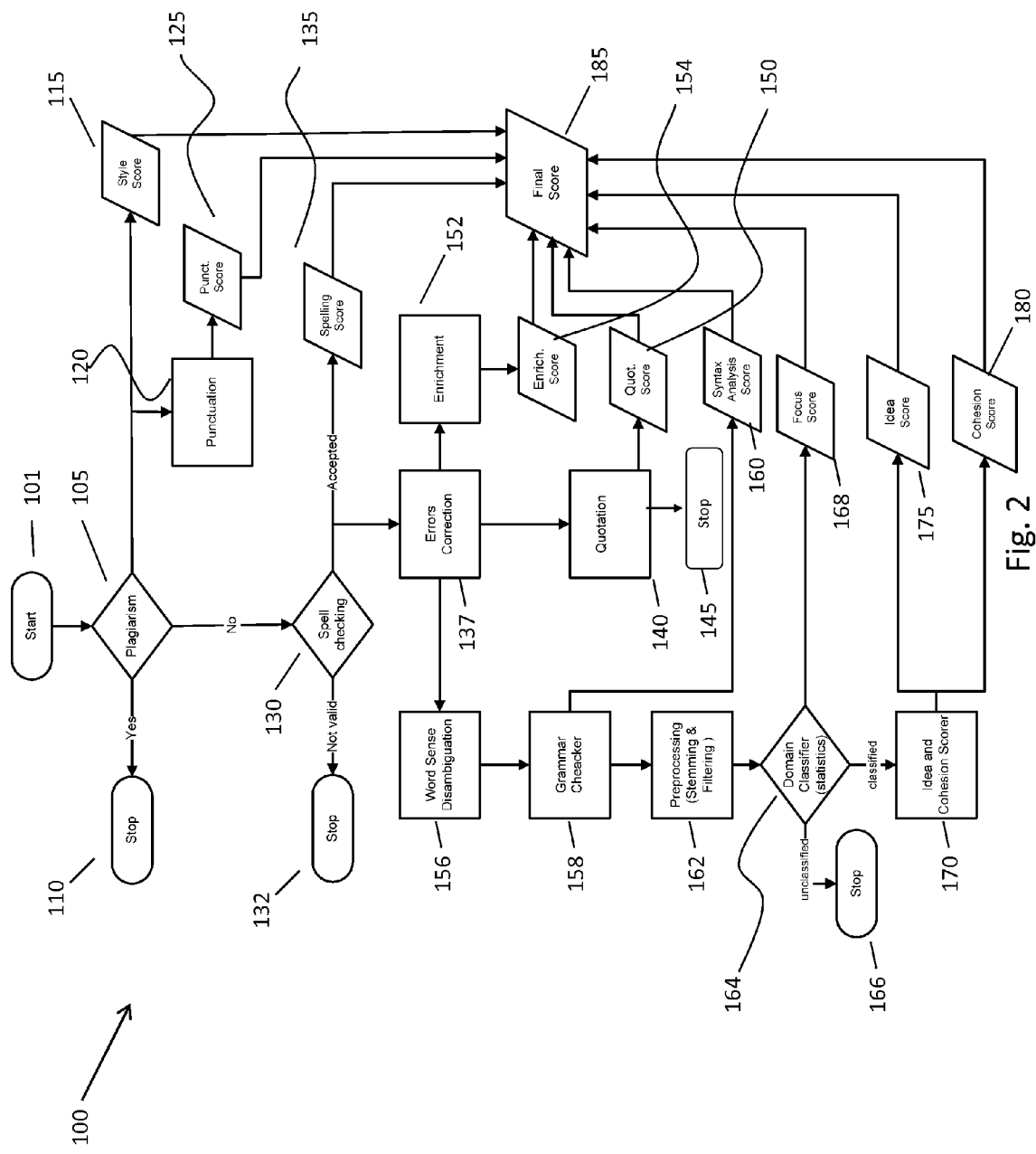
FIG. 2 is an illustrative representation of a system and/or flow of processes for implementing the invention in accordance with aspects of the invention.

As shown in FIG. 2, at step 101, invention process/system 100 begins. At step 105, the plagiarism module, as discussed in detail below with regard to FIGS. 3 and 4, determines the language style of an essay and how it may differ from other essays by using new words and combining words creatively. Further, at step 105, the plagiarism module determines whether or not the essay was plagiarized. At step 110, the invention process/system 100 stops if it is determined in step 105 that the essay may be plagiarized. At step 115, the plagiarism module provides a style score based on the determined language style if it is determined in step 105 that the essay is acceptable.

FIG. 2 is a representative system overview and/or process flow of aspects of the present invention. At step 120, the punctuation module, as discussed in detail below with regard to FIG. 5, evaluates punctuation mark usage in the essay and provides a punctuation score in step 125. At step 130, a spell checking module evaluates the accuracy of spelling in the essay, as discussed in detail below with regard to FIG. 6. At step 132, the invention process/system 100 stops if it is determined in step 130 that the spelling accuracy is below a predefined threshold. At step 135, the spell checking module provides a spelling score based on the determined spelling accuracy if it is determined in step 130 that the spelling accuracy is above or equal to a predefined threshold. Further, in step 130, a list is generated providing suggested words for each misspelled word and in step 137 the misspelled words are automatically corrected, as discussed in detail below with regard to FIGS. 7 and 8.

At step 140, the quotation module, as discussed in detail below with regard to FIGS. 9 and 10, evaluates an author's proficiency in using quotes in an essay by comparing sentences of the essay to known documents (training documents). At step 145, the invention process/system 100 stops if it is determined in step 140 that a percentage of the sentences in the essay that compare to sentences in the training documents is equal to or greater than a predetermined threshold. At step 150, the quotation module provides a quotation score based on the author's proficiency in using quotes if it is determined in step 140 that the percentage of sentences in the essay that compare to sentences in the training documents is less than a predetermined threshold.

Figure 11:
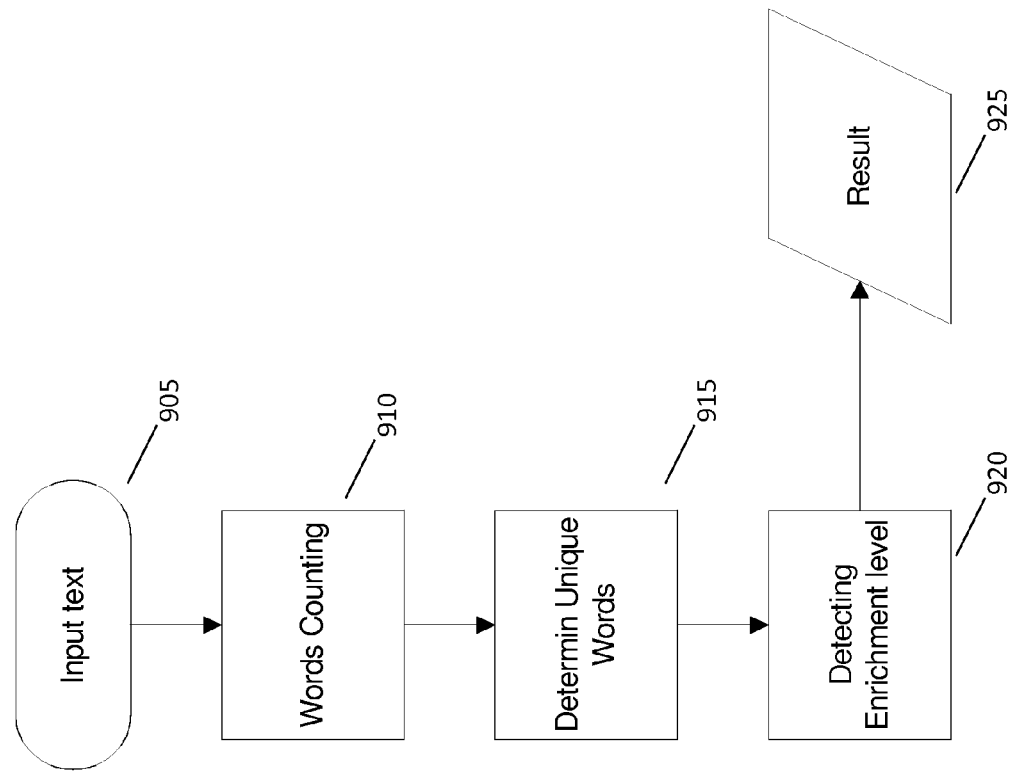
FIG. 11 is a flow diagram of an enrichment score phase in accordance with aspects of the invention.

At step 152, the enrichment module, as discussed in detail below with regard to FIG. 11, evaluates the author's proficiency in using new and accurate vocabularies in the essay and provides an enrichment score in step 154. At step 156, a word sense disambiguation (WSD) module, as discussed in detail below with regard to FIGS. 12 and 13, automatically determines the correct senses of all input words in the input document taking into account its position inside the phrase. At step 158, the grammar check module, as discussed in detail below with regard to FIGS. 14 and 15, analyzes the syntax of the input essay and determines grammar mistakes of the essay in order to provide a syntax analysis score in step 160.

Figure 16:
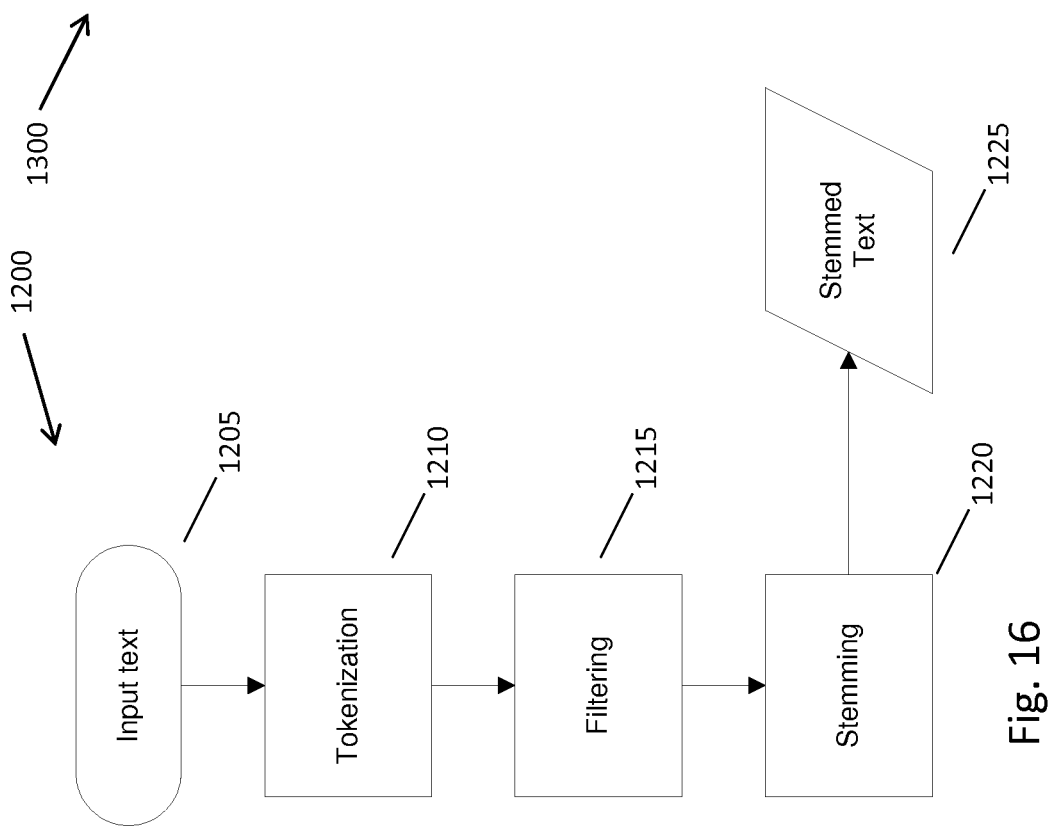
FIG. 16 is a flow diagram of a stemming and filtering phase in accordance with aspects of the invention.

At step 162, the invention process/system 100 automatically preprocesses and generates stemmed words from words in the essay for use in later processes, as discussed in detail below with regard to FIG. 16. At step 164, the domain classifier module, as discussed in detail below with regard to FIGS. 17 and 18, determines an essays' subject. If it is determined in step 164 that that the essay's subject is unclassified, then the invention process/system 100 stops at step 166. If it is determined in step 164 that the essay's subject is classified, then the domain classifier determines a focus level of the essay and provides a focus score based on the determined focus level in step 168.

At step 170, the idea and cohesion scorer module, as discussed in detail below with regard to FIGS. 19 and 20, determines (1) whether the essay is close or far from the required idea and (2) the relatedness between any phrase and the preceding phrases. Based on those two determinations the idea and cohesion module provides two scores, an idea score at step 175 and a cohesion score at step 180.

At step 185 a final rating of the essay is automatically generated using the style score from step 115, the punctuation score from step 125, the spelling score from step 135, the quotation score from step 150, the enrichment score from step 154, the syntax analysis score from step 160, the focus score from step 168, the idea score from step 175 and the cohesion score from step 180.

As discussed above with regard to FIG. 2, the plagiarism module in step 105 of the invention process/system 100 gives an indication about the language style of the essay and how it may differ from other essays by using new words and combining the words creatively. The style processing comprises two phases: a training phase 200 conducted offline and a testing phase 300 conducted during runtime, as show in FIGS. 3 and 4.

The training phase 200 is run on offline by applying preprocessing tools on a large data set (e.g., training documents) in order to determine the style of the essay, as shown in FIG. 3. At step 205, the data set is presented as a corpus that contains many files. The data set is then preprocessed at step 210 to apply text normalization. For example, the text normalization can be applied by removing Arabic diacritization from text and converting characters, as illustrated in Table 1.

TABLE 1

Characters after normalization

| Before | After |
|--------|-------|
| ا | ا |
| إ | ا |
| آ | ا |
| ى | ي |
| ة | ه |

At step 215, an N-gram is built in a list that contains a file name and file id since every file in the data set has an id for indexing. An n-gram is a subsequence of n items from a given sequence. An n-gram model is a type of probabilistic model for predicting the next item in such a sequence and is used in various areas of natural language processing. For example:
File name: Test
Sentence: actions speak louder than words
N-gram: 3
N-gram list is shown in Table 2.

TABLE 2

| N-gram List | | |
|---|---|---|
| N-gram | File Name | File Id |
| actions speak louder | Test | 1 |
| speak louder than | Test | 1 |
| louder than words | Test | 1 |

At step, 220 the n-gram lists that have been generated in step 215 are stored in a main database 220 that contains n-grams for all of the files.

The testing phase 300 runs at runtime (e.g., online) by processing the essay in order to determine its style, as shown in FIG. 4. At step 305, input text (e.g., the essay) is received from a user. The input text is then preprocessed, at step 310, to apply text normalization. For example, the text normalization is applied to remove the Arabic diacritization from text and convert characters as illustrated in Table 1. At step 315, an n-gram list is built for the essay in order to compare them with the n-grams that were generated during the training phase. After generating the n-gram of the input text, the testing phase n-gram list is compared, at step 320, with the training phase n-gram list of the main database 325 to check for records matching between both lists. In other words, when an item in the input n-grams matches another item in some database file there is a counter that is incremented by one; which represents how many items matched between input text and this file. After finishing the comparison process, results are obtained as a list that contains database file names and a number of matching records for every file.

At step 330, it is determined how the language style of the input text is different from the data set files in the main database 325. Obviously, when the style of the input text is more similar to the data set files the essay will get a lower score. Style similarity can be calculated using the following formula:

$$\text{Style Similarity} = 100 * \left( \frac{\text{listNgramforinputfile} - \text{RecordswhichMatchingwithfileonDataBase}}{\text{listNgramatinputfile}} \right)$$

If style similarity is more than 50%, that means the input text is most likely to be a copy from the main database and will be rejected causing the invention process/system 100 to stop at step 110, as discussed above with regard to FIG. 2. If the input text is not rejected, then in step 335 the style similarity is processed to create the style score that is then saved in the invention process/system 100, at step 115 in the memory 22a or the storage system 22b, and considered by the Abbir system during the process of generating the final rating of the essay at step 185, as discussed above with regard to FIG. 2.

Figure 5:
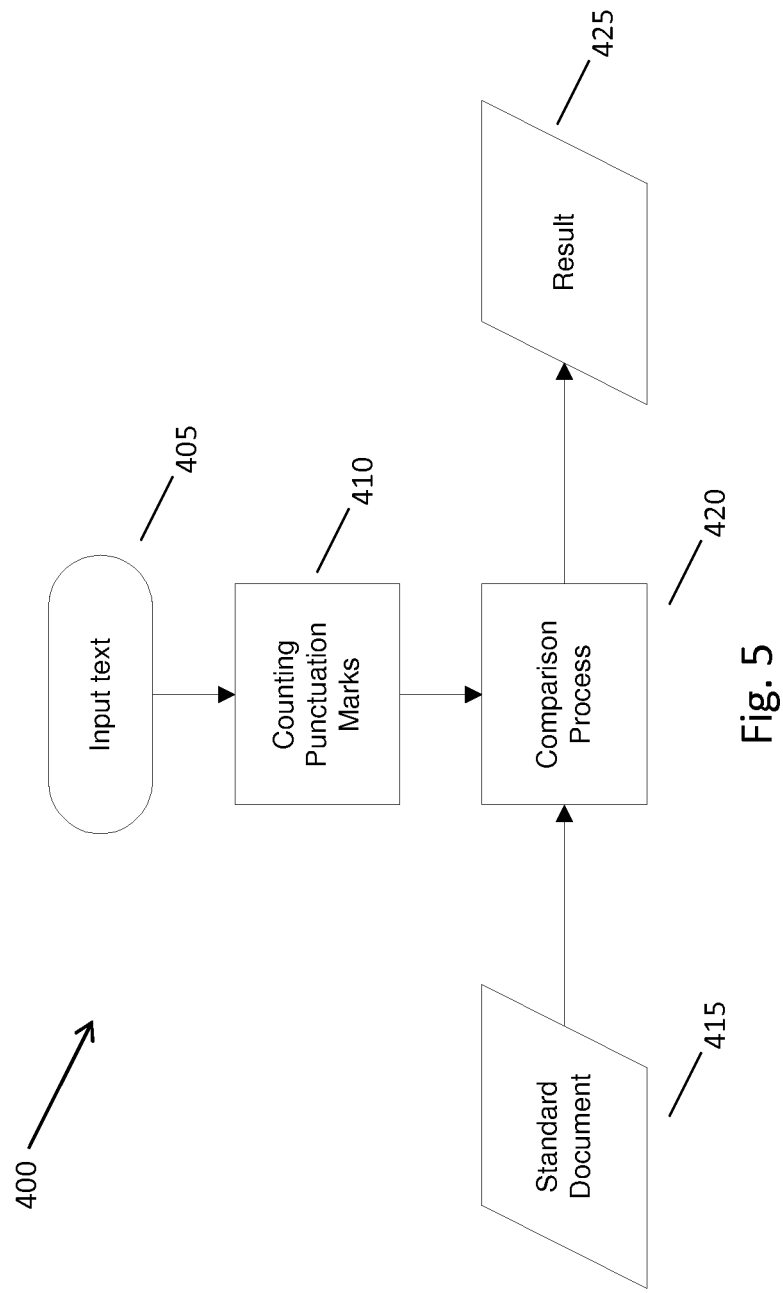
FIG. 5 is a flow diagram of a punctuation phase in accordance with aspects of the invention.

As discussed above with regard to FIG. 2, the next step 120 of the invention process/system 100 evaluates punctuation of the essay using the punctuation module. Punctuation marks are symbols which indicate the structure and organization of written language, as well as intonation and pauses to be observed when reading aloud. In the Abbir system, the goal of using a punctuation component is to evaluate how the punctuation marks are being used in the essay by comparing it with the training documents, as shown in FIG. 5.

The punctuation phase 400 starts, at step 405, to evaluate punctuation mark usage by receiving a user's input text (e.g., the essay). The input text is then processed, at step 410, by counting the number of punctuation marks. For example, the processing involves calculating the number of punctuation marks that are mentioned in Table 3. Additionally, step 410 includes deleting duplicate punctuation marks e.g., ("???", "!!!", ".)))", ",,,", or "}}{{").

TABLE 3

Punctuation Marks

| No. | Punctuation Mark |
|---|---|
| 1 | ? |
| 2 | . |
| 3 | ! |
| 4 | : |
| 5 | ; |
| 6 | - |
| 7 | — |
| 8 | ( |
| 9 | ) |
| 10 | [ |
| 11 | ] |
| 12 | , |
| 13 | { |
| 14 | } |

However, there are some instances that are not considered duplicate punctuation marks such as the following in Table 4.

TABLE 4

Punctuation Marks Not Considered Duplicates

| ... | ): | -: | }. | ?) | )! | ...) |
| .) | }: | .- | ...). | ..., | | |

As mentioned above, there are training documents (e.g., standard documents 415), which are used by the Abbir system as a base for assessing the quality of using punctuation marks. These are well-structured documents, which contain several types of punctuation marks that are used very carefully and accurately.

The process of assessing the quality of using punctuation marks can be achieved by comparing the average of using punctuation marks between the standard documents 415 and the essay. The punctuation mark usage average is calculated with the following equation:

$$P.M. \text{ Average} = \frac{\text{number of punctuation marks}}{\text{total number of words}}$$

After calculating the average number for each punctuation mark in the input text, the next step 420, is to compare each average number with the standard documents 415 average number for such punctuation mark. When the two numbers are equal or close to each other (e.g., ±5%), this means that the input text gets 100% for this punctuation mark and so on. Otherwise, the input text will get a score that represents the distance between the two average numbers. Specifically, the input text score is generated, at step 425, and then saved in the invention process/system 100, at step 125 in the memory 22a or the storage system 22b, and considered by the Abbir system during the process of generating the final rating of the essay at step 185, as discussed above with regard to FIG. 2.

Figure 6:
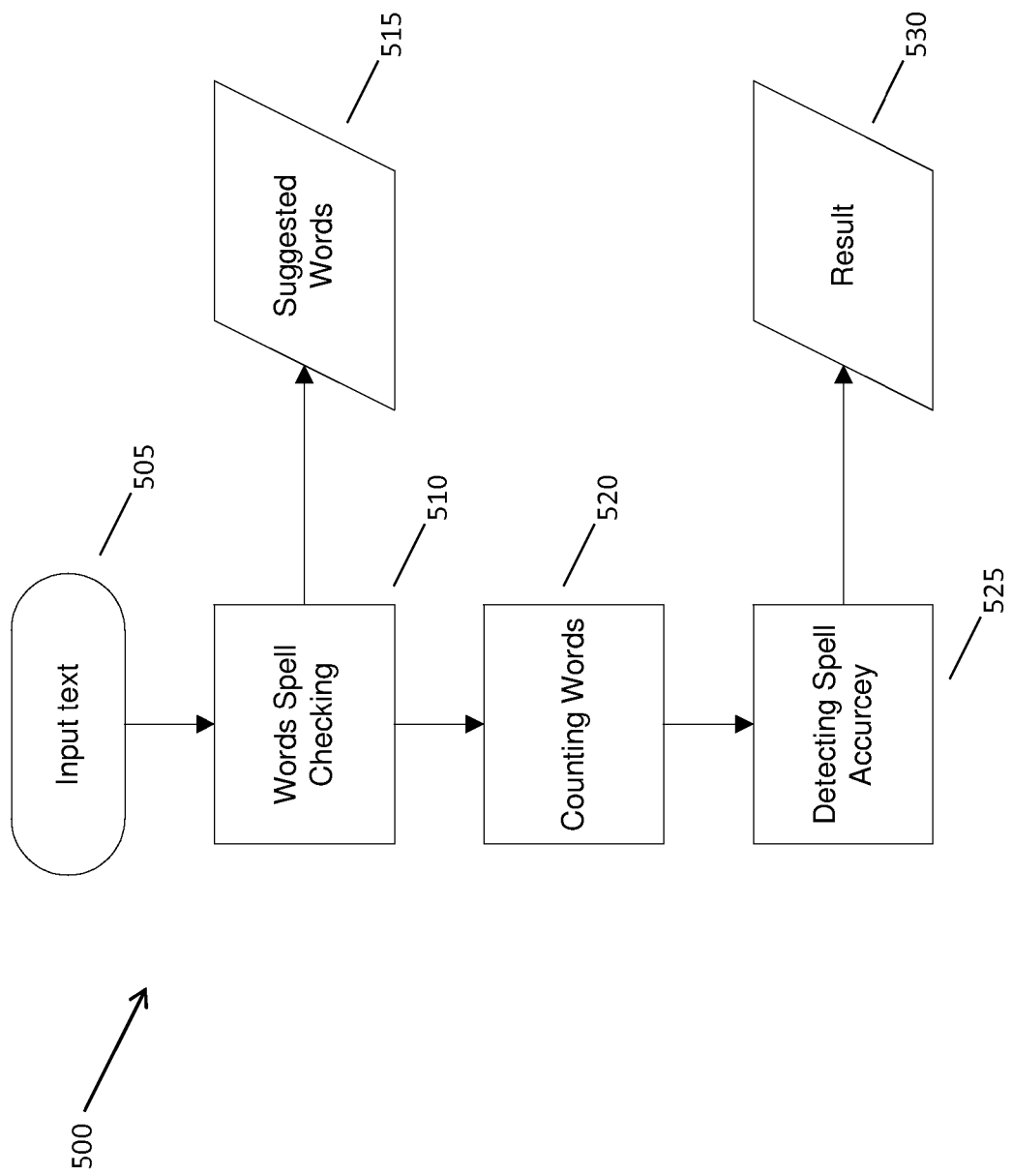
FIG. 6 is a flow diagram of a spell checking phase in accordance with aspects of the invention.

As discussed above with regard to FIG. 2, the next step 130 of the invention process/system 100 evaluates the spelling of the essay using the spell checker module. Spell checking is a process that flags words in a document that may not be spelled correctly in order to correct them. Normally, spell checkers operate on individual words by comparing each of them against a dictionary. If the word does not exist, then it is considered to be an error, and the spell checker may suggest several words that one of them was likely to have been intended. In the Abbir system, spell checking is one of the main components since it produces a score for each essay that will affect the final score. The spell checking process contains several steps in order to detect the spelling accuracy, as shown in FIG. 6.

The spellchecking phase 500 starts at step 505 to evaluate the accuracy of the spelling by receiving a user's input text (e.g., the essay). The input text is then processed, at step 510, by running a spell checker on the input text of an input file, which will generate, at step 515, an output file that contains misspelled words and a list of suggested right words for each misspelled word.

At step 520, counting tools are applied for calculating the number of words for the following files:
 1. Input file: to determine a total number of words in the original input file.
 2. Output file: to determine a number of misspelled words that have been detected by the spell checker.

At step 525, the following equation is applied in order to calculate the spelling accuracy:

$$\text{Spelling Accuracy} = \frac{\text{number of word in input file} - \text{number of word in output file}}{\text{Counting number of word for input file}}$$

If the spelling accuracy is less than a predetermined threshold then the input text will be rejected causing the invention process/system 100 to stop at step 132, as discussed above with regard to FIG. 2. If the input text is not rejected, then the spelling accuracy score is generated, at step 530, saved in the invention process/system 100, at step 135 in the memory 22a or the storage system 22b, and considered by the Abbir system during the process of generating the final rating of the essay at step 185, as discussed above with regard to FIG. 2.

As discussed above with regard to FIG. 2, the next step 137 of the invention process/system 100 automatically corrects the misspelled words in the essay since the existence of misspelled words in the essay will affect the quality of the latent semantic analyses process. The error correction process 600 comprises two phases: a training phase conducted offline and a testing phase conducted at runtime, as shown in FIG. 7.

Figure 7:
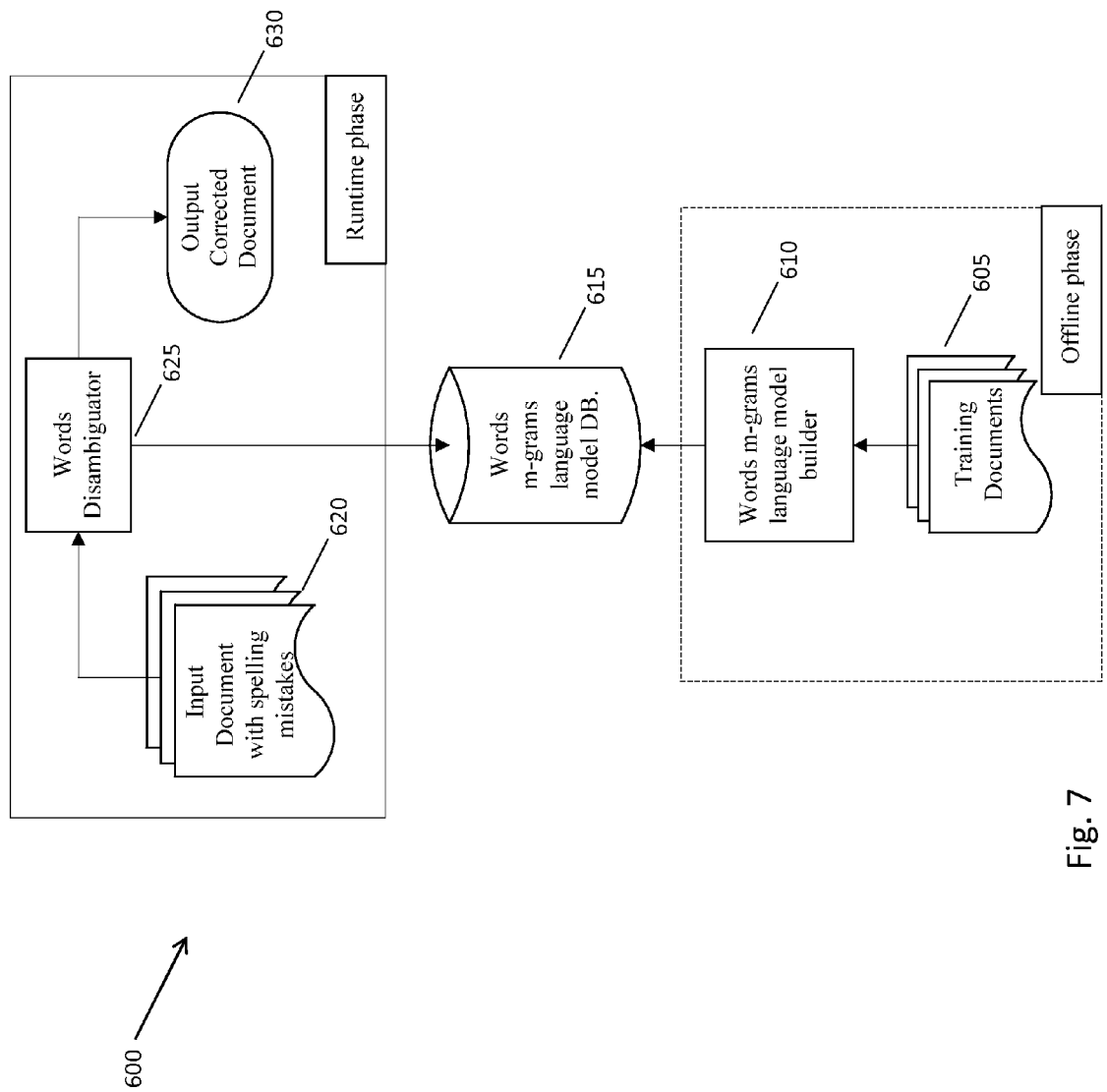
FIG. 7 is a flow diagram of an error correction phase in accordance with aspects of the invention.
Figure 8:
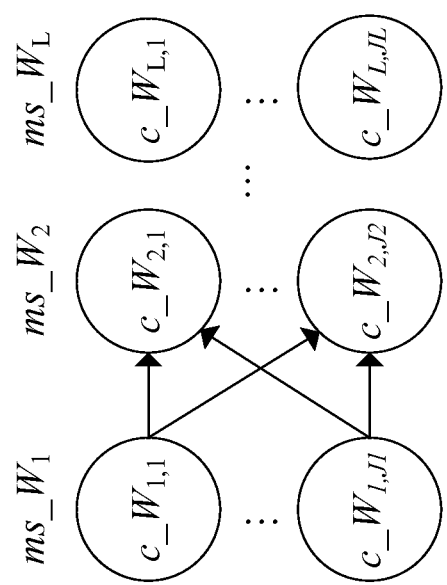
FIG. 8 is a search lattice for use in the error correction phase in accordance with aspects of the invention.

The error correction process 600 starts in the offline phase, at step 605, by providing a large set of collected perfect documents (e.g., the training documents) from several domains, as shown in FIG. 7. At steps 610 and 615, a tri-gram language model is built using conventional processes from all of the training documents and used to generate a words m-grams language model database. The error correction process 600 continues in the runtime phase, at step 620, by providing the input document (e.g., the essay) that is required to be corrected, as shown in FIG. 7. Also, as discussed above with regard to the spell checking phase 500 and process step 515, the input document file already contains the list of suggested words for all of the misspelled words in the input document. The combination of the input document and the list of suggested word is used to produce a search lattice, as shown in FIG. 8. Where $ms\_W_L$ is the misspelled word number "L" in the phrase and $c\_W_{L,JL}$ is the suggested correct word number "J" for the misspelled word number "L."

At step 625, a words disambiguator applies a lattice search algorithm to the words m-grams language model database that was already constructed during the offline phase, at step 615, in order to find an optimal path for the search lattice that is shown in FIG. 8. After finding the optimal path for each misspelled word in the input document the words disambiguator corrects the spelling for each misspelled word in the input document. The corrected input document containing the corrected misspelled words is then output, at step 630, and saved in the invention process/system 100, at step 137 in the memory 22a or storage system 22b, and considered by the Abbir system during the remaining processes, as discussed above in FIG. 2.

As discuss above in FIG. 2, the next step 140 of the invention process/system 100 automatically generates a score regarding the author's proficiency in using quotes in the essay using the quotation module. Specifically, the quotation module gives an indication about the essay author's knowledge and mentality when the proposed essay contains quotes from different sources. The quotation processing comprises two phases: a training phase 700 conducted offline and a testing phase 800 conducted at runtime, as shown in FIGS. 9 and 10.

Figure 9:
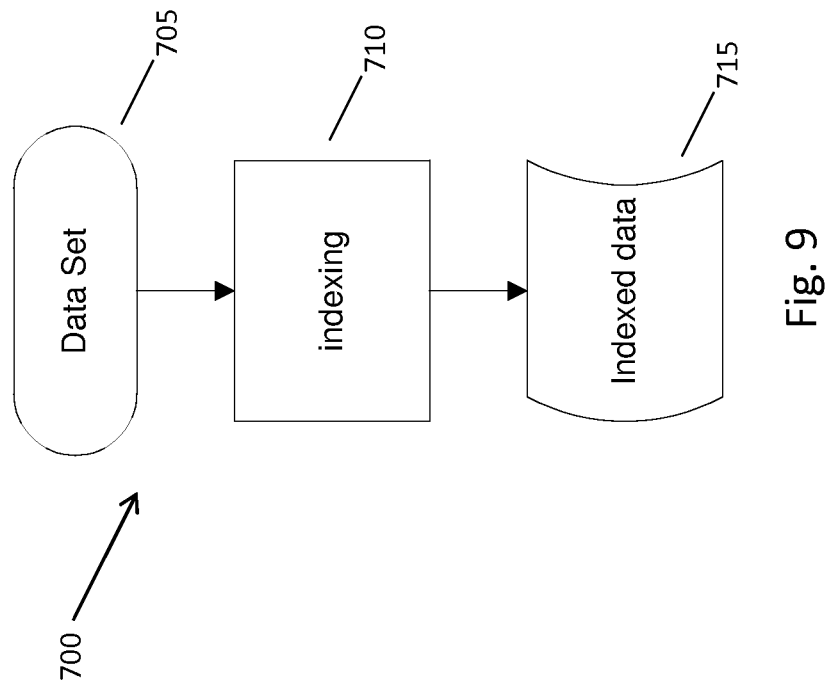
FIG. 9 is a flow diagram of a quotation training phase in accordance with aspects of the invention.

The training phase 700 is run offline by applying an indexing tool on a data set that represents the ideal source of quotes, as shown in FIG. 9. At step 705, the data set (e.g., training documents) is presented as any trusted text corpora that are expected to be quoted in a proposed essay. The data set is then indexed using an indexing tool at step 710 to speed up the searching of the data set in the testing phase 800. At step 715, an indexed data file is outputted and saved as a result of the indexing of the data set in step 710.

Figure 10:
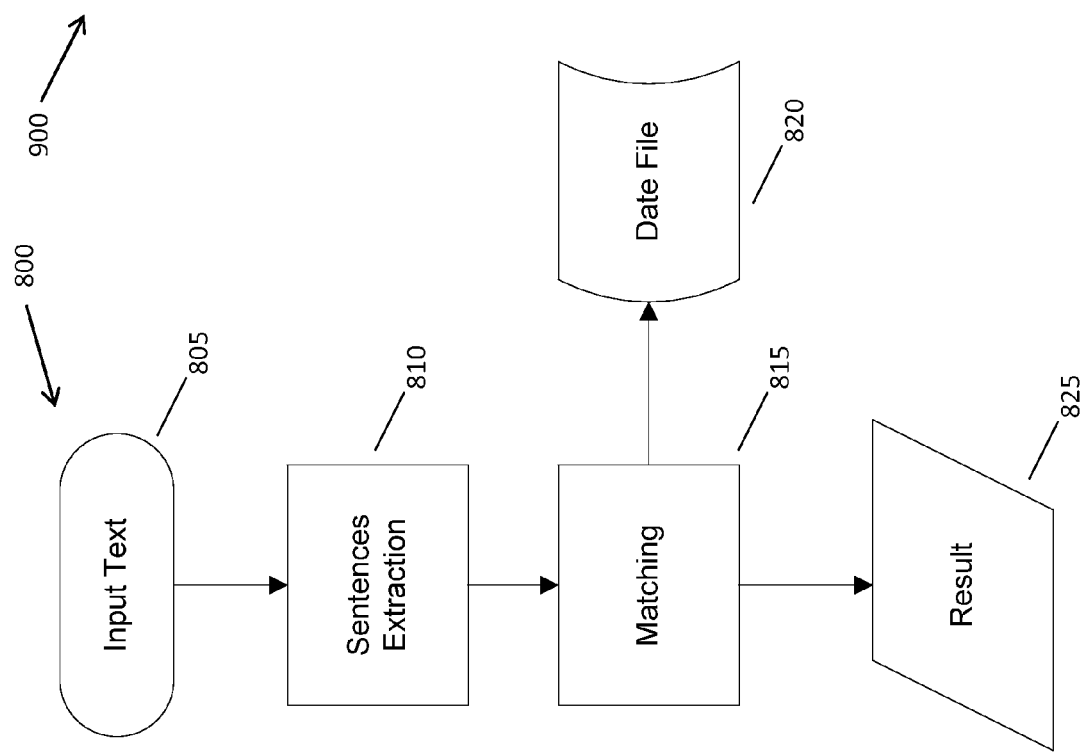
FIG. 10 is a flow diagram of a quotation testing phase in accordance with aspects of the invention.

The testing phase 800 runs at runtime by checking the essay in order to automatically determine its quotation score, as shown in FIG. 10. At step 805, input text (e.g., the essay) is received from the user. The input text is preprocessed, at step 810, to extract sentences from the input text. In particular, the Abbir system divides the input text into sentences in order to compare those sentences to the corpus indexed data file. At steps 815 and 820, the list of extracted sentences is compared to the corpus indexed data file and processed using the following equation in order to calculate how many extracted sentences are matched from the indexed data file:

$$\frac{\text{total list of sentences} - \text{total list of matched sentences}}{\text{total list of sentences}}$$

If the quotation comparison is equal to or more than 20%, the input essay will be rejected causing the invention process/system 100 to stop at step 145, as disc used above with regard to FIG. 2. If the input essay is not rejected, then in step 825 the quotation comparison is processed to create a score that is then saved in the invention process/system 100, at step 150 in the memory 22a or the storage system 22b, and considered by the Abbir system during the process of generating the final rating of the essay at step 185, as discussed above with regard to FIG. 2.

As discussed above with regard to FIG. 2, the next step 152 of the invention process/system 100 automatically generates a score regarding the author's proficiency in using new and accurate vocabularies using the enrichment module. The language enrichment phase 900 is an important aspect for written essays in that the use of new and accurate vocabularies gives an indication about the writer's skills and enables him/her to write advanced essays. In the Abbir system, enrichment is one of the main components that are determined by detecting new vocabularies used in the input essay. The language enrichment process comprises several steps in order to generate a score, as shown in FIG. 11.

At step 905, input text (e.g., the essay) is received from a user. The input text is then preprocessed, at step 910, to determine unique words used in the input text. In particular, the Abbir system applies counting tools to calculate the total number of words in the input text along with their occurrence times. At step 915, the Abbir system extracts the basis words in the document (e.g., takes one word from any repetition). By way of non-limiting example, if the document consists of 100 words, and these 100 words are 70 words occurred just a single time+30 words repeated, wherein the 30 repeated words are actually only 10 words with some repetition, then the number of unique words for this document are 70+10=80 words. At step 920, the number of unique words are then compared to the total number of words used in the input text using the following equation in order to determine an enrichment level:

$$\text{Enrichment} = \frac{\text{Number of unique words}}{\text{Total number of words}}$$

At step 925 the enrichment level is processed to create a score that is then saved in the invention process/system 100, at step 154 in the memory 22*a* or storage system 22*b*, and considered by the Abbir system during the process of generating the final rating of the essay at step 185, as discussed above with regard to FIG. 2.

As discussed above with regard to FIG. 2, the next step 156 of the invention process/system 100 is the WSD process that automatically determines the correct senses of all input words in the input document (e.g., the essay) taking into account their position inside corresponding phrases. The WSD process comprises two phases: a training phase conducted offline and a testing phase conducted at runtime, as shown in FIG. 12.

The WSD process is based on the well known theory of Semantic fields. In this theory, each language can be described with some bases set of semantic fields. Each semantic covers all related words in that language with this semantic field (e.g., The semantic field is "love" and the words that are covered with this semantic field are "like-adore-admire-... etc."). Thus, using the bases set instead of all possible words in the language reduces the language complexity. However, the main problem is with regard to any word that can be found under several semantic fields depending on its meaning (e.g., the word "bank" can be "depository", "river side" or any other meaning depending on the context). Therefore, the idea of the WSD is to find the right sense of the input word depending on the delivered context with this word.

Figure 12:
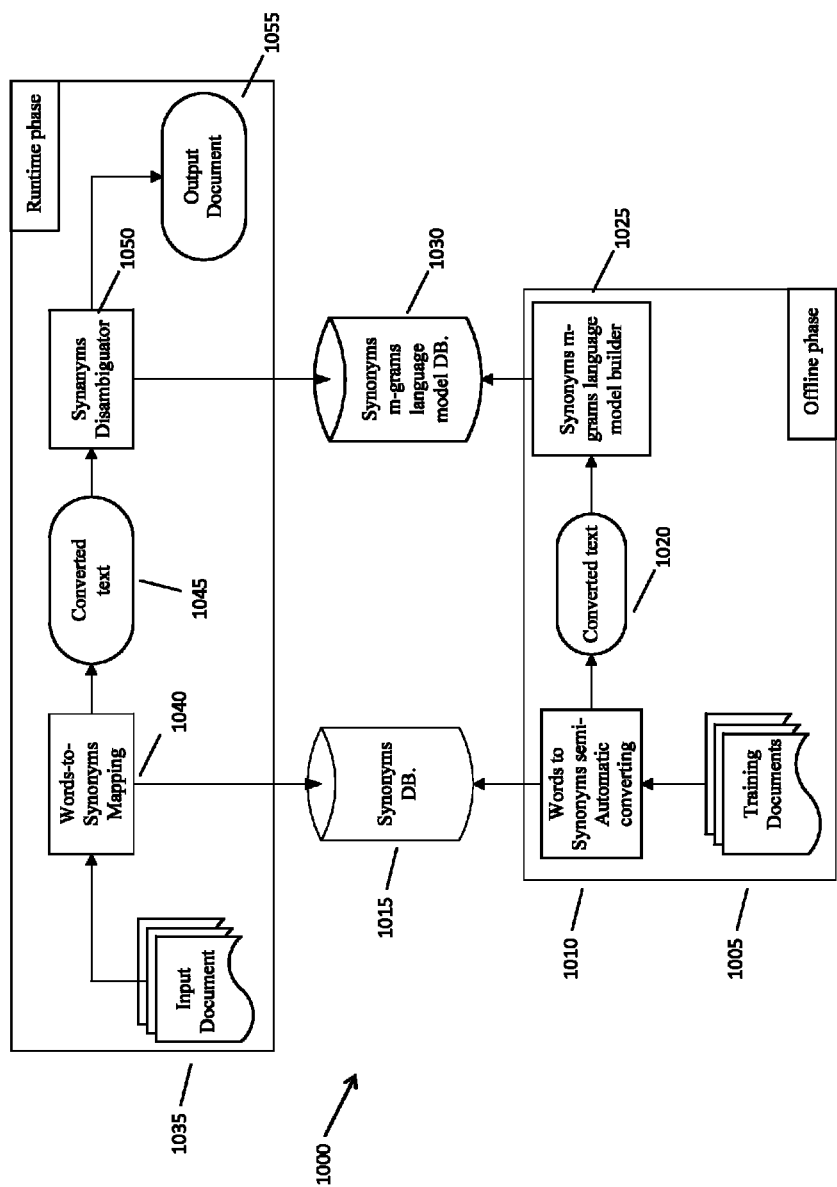
FIG. 12 is a flow diagram of a Word Sense Disambiguation (WSD) process comprising an training phase and a testing phase in accordance with aspects of the invention.

The WSD process 1000 starts in the offline phase, at step 1005, by providing a large set of collected perfect documents (e.g., training documents) from several domains, as shown in FIG. 12. At step 1010, the training documents are split into phrases and each phrase is split into words. All possible synonyms for each word are automatically extracted from a synonym database provided in step 1015. Thus, each word now has one or more synonyms. For the words that have more than one synonym, language experts are used to judge which synonym is the right one depending on the phrase context. Subsequently at step 1020, an output file is generated comprising the converted text, which is each word from the training documents having only one synonym. The offline phase continues, at steps 1025 and 1030, by building a tri-gram language model using conventional processes from all of the training documents and producing a synonyms m-grams language model database.

Figure 13:
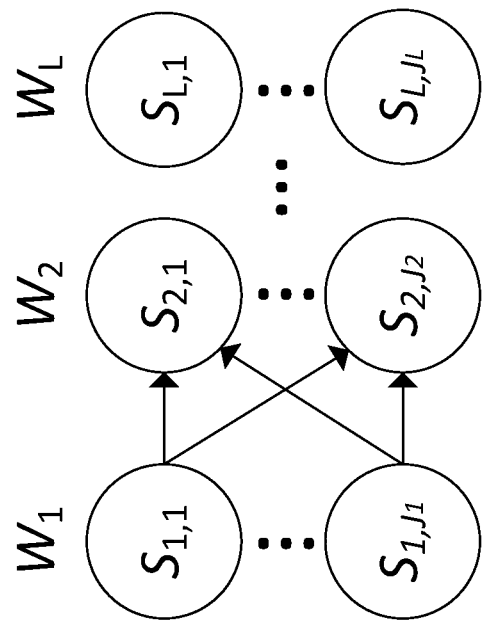
FIG. 13 is a search lattice for use in the testing phase of the Word Sense Disambiguation process in accordance with aspects of the invention.

The WSD process 1000 continues in the runtime phase, at step 1035, by providing the input document (e.g., the essay) that is required to be converted to its senses, as shown in FIG. 12. At step 1040, the input document is split into phrases and all of the possible synonyms for each word are automatically extracted from the synonym database provided in step 1015. Thus, each word in the input document now has at least one synonym. Subsequently at step 1045, an output file comprising the converted text, which is each word from the input document having at least one synonym, is used to produce a search lattice, as shown in FIG. 13. Where $W_L$ is the word number "L" in the phrase and $S_{L,JL}$ is the sense number "J" for the word number "L."

At step 1050, a synonym disambiguator applies a lattice search algorithm to the synonym m-grams language model database that was already constructed during the offline phase, at step 1030, in order to find an optimal path for the search lattice that is shown in FIG. 13. After finding the optimal path for each word in the input document the synonym disambiguator matches only one appropriate synonym with each word. A document is outputted, at step 1055, which includes each word from the input document with a single appropriate synonym. The document is then saved in the invention process/system 100, at step 156 in the memory 22*a* or storage system 22*b*, and considered by the Abbir system during the remaining processes, as discussed above with regard to FIG. 2.

As discussed above with regard to FIG. 2, the next step 158 of the invention process/system 100 is the grammar checker process that automatically studies the grammar mistakes of the input essay in order to provide a score using the grammar checker module. Specifically, the grammar checker module analyzes the syntax of the input essay. The grammar checker process comprises two phases: a training phase conducted offline and a testing phase conducted at runtime, as shown in FIG. 15.

Syntax analysis is actually one of the most difficult tasks that face anyone in the Natural Language Processing (NLP) field. This is due to its large variability and its high complexity. Although this problem is clear in all natural languages, it is highly prevalent in Arabic language because in Arabic there are no fixed or limited forms for a phrase. Instead, phrases in Arabic can be written in several uncounted forms, which make Arabic one of the richest languages in the world. Thus, the grammar checker module is mainly a statistical system and tries to reduce the complexity by using the same theory of the Semantic fields and the WSD that are described above. This enhances the statistical perturbation during the training phase.

Figure 15:
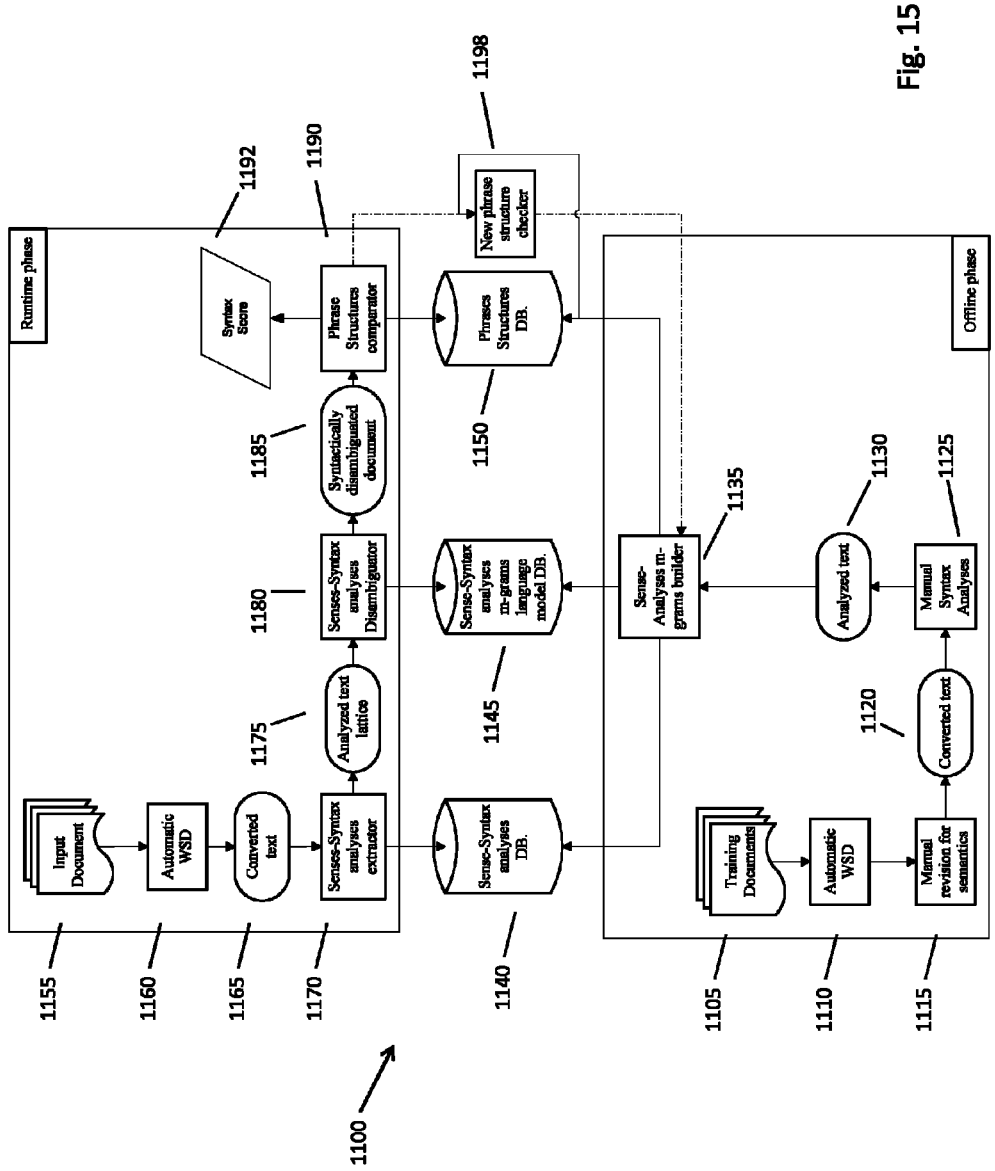
FIG. 15 is a search lattice for use in the testing phase of the grammar checker process in accordance with aspects of the invention.

The grammar checker process 1100 starts in the training phase, which is conducted offline, at step 1105, by providing a large set of collected perfect documents (e.g., training documents) from several domains, as shown in FIG. 15. At step 1110, the input training documents are automatically disambiguated for senses as described in the WSD process 1000 described above. At step 1115, the disambiguated training documents are manually revised by experts in order to assure the quality of the disambiguated training documents. Thus, the automatic WSD process 1000 is used to accelerate the process of the word sense disambiguation. Subsequently after the manual revision of semantics, at step 1120, an output file is generated comprising the converted text, which is each word from the input training documents having only one correct synonym. The converted texts are passed to experts, at step 1125, to manually analyze the documents for syntax in order to give each word its right tag (e.g., verb-subject-preposition-... etc.). Subsequently after the manual syntax analysis, at step 1130, an output file is generated comprising the analyzed text.

The training phase continues, at steps 1135, 1140, 1145 and 1150 by building a tri-gram language model using conventional processes from all of the analyzed training documents and producing three types of databases. A sense-syntax analyses m-grams language model database contains the tri-gram language models of the (synonym-tag pairs) in the analyzed documents. A sense-syntax analyses database contains all possible tags for each sense that are found in the training documents during the training phase. A phrase structures database contains all possible phrases structures that are found in the training documents during the training phase.

The grammar checker process 1100 continues in the testing phase, which is conducted during the runtime, at step 1155, by providing the input document (e.g., the essay) that is required to be scored for grammar, as shown in FIG. 15. At step 1160, the input document is automatically disambiguated for senses as described in the WSD process 1000 discussed above. Thus, each word in the input document now has at least one synonym. Subsequently at step 1165, an output file is generated comprising the converted text, which is each word from the input document having at least one synonym. At step, 1170, a senses-syntax analyses extractor extracts all possible syntax analyses for each synonym in the converted text from the sense-syntax analyses database generated in step 1140.

Figure 14:
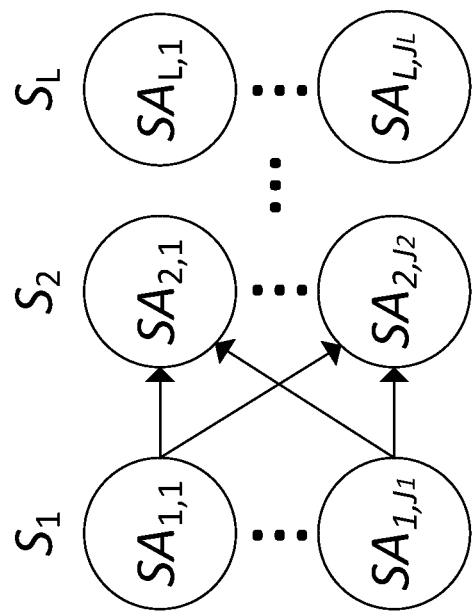
FIG. 14 is a flow diagram of a grammar checker process comprising a training phase and a testing phase in accordance with aspects of the invention.

At step 1175, the output from the senses-syntax analyses extractor is used to produce a search lattice, as shown in FIG. 14. Where $S_L$ is the Sense of the word number "L" in the phrase and $SA_{L,JL}$, is the Syntax Analyses number "J" for the Sense of the word number "L." At step 1180, a senses-syntax analyses disambiguator applies a lattice search algorithm to the sense-syntax m-grams language model database that was already constructed during the offline phase, at step 1145, in order to find an optimal path for the search lattice that is shown in FIG. 14. After finding the optimal path for each word in the input document the senses-syntax analyses disambiguator matches the appropriate syntax analyses with each word. A syntactically disambiguated document is outputted, at step 1185, which includes each word from the input document with only one syntax analyses.

The syntactically disambiguated document comprises several phrases and each phrase has a pattern consisting of a sequence of syntax analyses. A sense-syntax analyses extractor takes each pattern, at step 1190, and searches for it in the phrase structures database generated in step 1150. If a pattern does not exist, the grammar checker score is decreased in step 1192. A final grammar checker score is tallied in step 1192, and then saved in the invention process/system 100, at step 160 in the memory 22a or the storage system 22b, and considered by the Abbir system during the process of generating the final rating of the essay at step 185, as discussed above with regard to FIG. 2.

The grammar checker module enables automatic learning (e.g., artificial intelligence), in step 1198. Specifically, the grammar checker checks the syntax score and if the score is equal to or less than a predetermined threshold, then the system will not consider the identified wrong structures. However, when the score is higher than the predetermined threshold this means that there is a possibility that the identified wrong structures are right, but the grammar checker module had not seen the structures previously during the training phase. Thus, the grammar checker will add these new structures into a pre-created temporary database. If any of these structures have been already added before, then the module will increment its count. Otherwise, the grammar checker will provide a count=1. If any count of the identified wrong structures inside the temporary database becomes higher than a predetermined level, then this wrong structure is reconsidered as correct and the module passes the indicated correct structure to the sense-analyses m-grams language model builder to update all databases.

As discussed above with regard to FIG. 2, the next step 162 of the invention process/system 100 automatically generates stemmed words for use in later processes. In particular, text preprocessing is an essential part of any NLP Application, especially a stemming component. In the Abbir system, stemming and filtering 1200 is a main component that is performed by preprocessing the input text, as shown in FIG. 16.

At step 1205, the input text (e.g., the essay) is received from the user. A tokenization component, at step 1210, excludes undesired characters and numbers that are contained in the input text. A filtering process is then performed in step 1215 in which all stop words are removed that occur frequently e.g., in, on and to. These stop words do not have any negative effect when they have been deleted. A stemming process is then performed in step 1220 in which the remaining words are reduced to their stem in order to minimize processing over head and increase the accuracy of the Abbir system. At step 1225, the resultant stemmed text is saved in the invention process/system 100, at step 162, in the memory 22a or the storage system 22b, and considered by the Abbir system during the remaining processes, as discussed above with regard to FIG. 2.

As discussed above with regard to FIG. 2, the next step 164 of the invention process/system 100 is a domain classifier process that automatically determines an essays' subject and determines its focus level in order to provide the focus score using the domain classifier module. Statistics is the formal science of making effective use of numerical data relating to groups of individuals or experiments. Statistics deal with all aspects of making effective use of numerical data including not only the collection, analysis and interpretation of such data, but also the planning of the collection of data, in terms of the design of surveys and experiments. In the Abbir system, statistics are used heavily in order to classify the essay and then to produce the focus score, which reflects how the input text is focusing on such a topic. The domain classifier process comprises two phases: a training phase 1300 conducted offline and a testing phase 1400 conducted at runtime, as shown in FIGS. 17 and 18.

Figure 17:
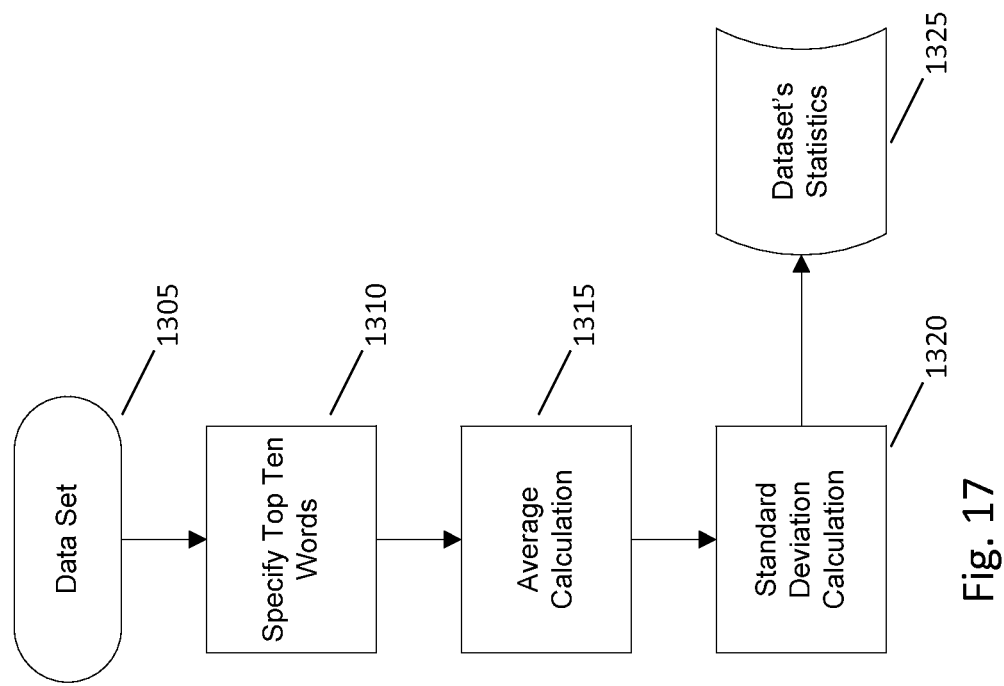
FIG. 17 is a flow diagram of a training phase of a domain classifier and focus scorer process in accordance with aspects of the invention.

The domain classifier process starts in the training phase 1300, which is conducted offline, at step 1305, by providing a large set of collected perfect documents (e.g., training documents) from various domains, as shown in FIG. 17. At step 1310, the input training documents are automatically processed to determine ten words with the highest frequency and a count of a total number of occurrences for those ten words. For each top ten word, a weight is calculated in step 1315 using the following formulas:

$$\text{Weight}_w = \text{Word Count}_d * \left(\frac{\text{Words\_Total}}{\text{Ten Words Total}}\right)$$

$$\text{Weight of file} = \sum_{i=1}^{10} \text{Weight}_{w_i}$$

$$\text{Average} = \frac{\text{Weight of file}}{\text{Document Count}_d}$$

While the Word Count$_d$ is the total count number of such word in the document d and the word total is the total count number of such word in all documents. The Ten Words Total is the sum of all the count numbers of the top ten words in all of the documents. Also, the Document Count$_d$ is the count number of the words in the document d while the Average represents the average number of the top ten words' weights in this document.

Subsequently, at step 1320, a standard deviation is calculated for all Average values that have been generated at step 1315. At step 1325, the top ten words and their statistics are saved in order to be used in the testing phase.

The domain classifier process continues in the testing phase 1400, which is conducted during the runtime, at step 1405, by providing the input document that is required to be classified and scored for focus, as shown in FIG. 18. At step 1410, the input document is automatically processed to determine the frequency of the words in the input document and to provide a count of the total number of occurrences for each word. At step 1415, the top ten words weights are calculated for the input document, as discussed in the training phase 1300. Subsequently at step 1420, the input text average value is compared with the training documents average values that were calculated in the offline training phase.

The goal of the comparison process is to determine the topic of the input document by detecting the most similar training documents to the input document. The following equation is used in step 1420:

$$AverageSD_d = Average_d \pm (Standard\ Deviation * 1.65)$$

Specifically, at step 1420, the topic of the input document is determined and a determination is made as to whether the topic of the input document is a classified domain or an unclassified domain. Classified domains are the various domains that are used in the documents classifier training phase 1300 (e.g.: news domain-sport domain-science domain . . . etc). Unclassified domains are any domain other than the classified domains. For example, the documents classifier is trained in the training phase 1300 with only training documents from sport and science domains, while in the testing phase 1400, the input document is determined as pertaining to a news topic (e.g., a news domain). Thus, the document classifier will not be able to classify the input document and the document classifier will determine that the input document is an unclassified domain and the invention process will stop at step 166. On the other hand, if the input document pertains to a sports topic (e.g., a sports domain), then the domain classifier will be able to classify the input document and the testing phase 1400 will continue at step 1425.

Once the topic of the input document is determined and it is determined that the input document is a classified document, the focus score will be calculate in step 1425 using the following equations:

$$\text{Test file\_words\_Weight}_w = \text{Word Count}_d * \left(\frac{\text{Words\_Total}}{\text{Ten Words Total}}\right)$$

$$\text{Test file\_Weight} = \sum_{i=1}^{10} \text{Test file\_words\_Weight}_{w_i}$$

focus score =

$$\begin{cases} \left(\dfrac{\text{Test file\_Weight}}{Average_d - (Standard\ Deviation * 1.65)}\right) * 100 \\ \left(1 - \dfrac{Average_d + (Standard\ Deviation * 1.65) - \text{Test file\_Weight}}{Average_d + (Standard\ Deviation * 1.65)}\right) * 100 \\ 100 \end{cases}$$

; Test file_Weight ≤ $Average_d$ − (Standard Deviation * 1.65)

; Test file$_{Weight}$ ≤ $Average_d$ + (Standard Deviation * 1.65)

; Otherwise

The focus score is then saved in the invention process/system 100, at step 168 in the memory 22a or the storage system 22b, and considered by the Abbir system during the process of generating the final rating of the essay at step 185, as discussed above with regard to FIG. 2.

As discussed above with regard to FIG. 2, the next step 170 of the invention process/system 100 is an idea and cohesion process. The idea portion of the process provides an idea score that reflects how close or far away the essay is from the required idea. The cohesion portion of the process determines the relatedness between any phrase and a preceding phrase and provides a cohesion score based on the relatedness. For example, the cohesion takes into consideration whether the essay moves from any phrase to another phrase smoothly or whether the document is just hard jumping from one idea to another without any preamble. In the Abbir system, the main concept of this module is built on the latent semantic analyses (LSA) theory. The idea and cohesion process comprises two phases: a training phase 1500 conducted offline and a testing phase 1600 conducted at runtime and several steps in order to determine the idea and the cohesion scores, as shown in FIGS. 19 and 20.

The idea and cohesion process starts in the training phase 1500, which is conducted offline, at step 1505, by providing a large set of collected perfect documents (e.g., training documents) from several domains, as shown in FIG. 19. In a pre-processing step 1510 all of the training documents, their idea scores, cohesion scores and the number of spelling mistakes are obtained. By way of non-limiting example, some parameters are calculated and saved as follow:

i. The unique words are stored in a variable called "unique_words."
  ii. The idea scores are stored in a variable called "Scores."
  iii. The cohesion scores are stored in a variable called "Scors_cohesion."
  iv. The number of spelling mistakes is stored in a variable called "spelling_mistakes_in_each_file."
  v. The frequency of each word in each document is stored in a variable called "unique_words_in_each_file."
  vi. The number of unique words in each file is stored in "no_of_unique_words_in_each_file."

Thus, after these process steps there are two paths (an idea path and a cohesion path).

Regarding the idea path, in step 1515 an occurrence matrix (m*n) is constructed. For example, the following equation is used to construct the occurrence matrix:

$$\text{occurrence matrix} = \begin{bmatrix} f_{1,1} & \cdots & f_{1,n} \\ \vdots & \ddots & \vdots \\ f_{m,1} & \cdots & f_{m,n} \end{bmatrix}$$

Where "m" is the number of unique words in all training files and "n" is the number of files, and each element $L_j$ in the matrix is the frequency of word number "i" in the document number "j." Also, $f_{i,j}$ is the frequency of word "i" inside the document "j"; where 1≤1≤m; 1≤j≤n The probability of each word inside the document number "j" is calculated in step 1520 by dividing each column in the previously constructed occurrence matrix by the sum of all words inside the document "j". The result is then stored in a variable temp using the following equation:

$$temp = \begin{bmatrix} \dfrac{f_{1,1}}{\sum_{i=1}^{m} f_{i,1}} & \cdots & \dfrac{f_{1,n}}{\sum_{i=n}^{m} f_{i,n}} \\ \vdots & \ddots & \vdots \\ \dfrac{f_{m,1}}{\sum_{i=1}^{m} f_{i,1}} & \cdots & \dfrac{f_{m,n}}{\sum_{i=n}^{m} f_{i,n}} \end{bmatrix}$$

Subsequently, an Entropy_Occurrence_Matrix is calculated using the following equation where the Entropy_Occurrence_Matrix=(−1)*temp*log(temp) and 0*log(0)=0:

Entropy_Occurrence_Matrix =

$$\begin{bmatrix} \dfrac{f_{1,1}}{\sum_{i=1}^{m} f_{i,1}} * \log \dfrac{f_{1,1}}{\sum_{i=1}^{m} f_{i,1}} & \cdots & \dfrac{f_{1,n}}{\sum_{i=n}^{m} f_{i,n}} * \log \dfrac{f_{1,n}}{\sum_{i=n}^{m} f_{i,n}} \\ \vdots & \ddots & \vdots \\ \dfrac{f_{m,1}}{\sum_{i=1}^{m} f_{i,1}} * \log \dfrac{f_{m,1}}{\sum_{i=1}^{m} f_{i,1}} & \cdots & \dfrac{f_{1,n}}{\sum_{i=n}^{m} f_{i,n}} * \log \dfrac{f_{m,n}}{\sum_{i=n}^{m} f_{i,n}} \end{bmatrix}$$

In step 1525, an SVD is applied on the Entropy_Occurrence_Matrix as follow: [U, S, V]=svd (Entropy_Occurrence_Matrix,N). Where N is the selected dimension and svd (X, N) is a function that calculates the singular value decomposition for the given matrix X and dimension N. Subsequently, the SVD_Parameters=$S^{-1}*U^T$ are calculated at the end the Domain_model=SVD_Parameters*Entropy_Occurrence_Matrix.

Regarding the cohesion path, in step 1530, each training document is split into phrases and a phrases occurrence matrix (k*1) is constructed using the following equation:

$$\text{phrase occurrence matrix} = \begin{bmatrix} Df_{1,1} & \cdots & Df_{1,l} \\ \vdots & \ddots & \vdots \\ Df_{k,1} & \cdots & Df_{k,l} \end{bmatrix}$$

Where "k" is the number of unique words in the given training document and "1" is the number of phrases in the training document and each element $Df_{i,j}$ in the matrix is the frequency of word number "i" in the phrase number "j." Also, where $Df_{i,j}$ is the frequency of word "i" inside the phrase "j"; where $1 \leq i \leq k$; $1 \leq j \leq 1$.

The probability of each word inside phrase number "j" is calculated in step 1535 by dividing each column in the previously constructed phrase occurrence matrix by the sum of all words inside phrase "j." The result is then stored in a variable temp using the following equation:

$$temp = \begin{bmatrix} \dfrac{Df_{1,1}}{\sum_{i=1}^{k} Df_{i,1}} & \cdots & \dfrac{Df_{1,l}}{\sum_{i=n}^{k} Df_{i,l}} \\ \vdots & \ddots & \vdots \\ \dfrac{Df_{m,1}}{\sum_{i=1}^{k} Df_{i,1}} & \cdots & \dfrac{Df_{k,l}}{\sum_{i=n}^{k} Df_{i,l}} \end{bmatrix}$$

Subsequently, a Cohesion_Entropy_Occurrence_Matrix is calculated using the following equation where Cohesion_Entropy_Occurrence_Matrix=(−1)*temp*log(temp) and 0*log(0)=0:

Cohesion_Entropy_Occurrence_Matrix =

$$\begin{bmatrix} \dfrac{Df_{1,1}}{\sum_{i=1}^{k} Df_{i,1}} * \log \dfrac{Df_{1,1}}{\sum_{i=1}^{k} Df_{i,1}} & \cdots & \dfrac{Df_{1,l}}{\sum_{i=l}^{k} Df_{i,l}} * \log \dfrac{Df_{1,l}}{\sum_{i=l}^{k} Df_{i,l}} \\ \vdots & \ddots & \vdots \\ \dfrac{Df_{k,1}}{\sum_{i=1}^{k} Df_{i,1}} * \log \dfrac{Df_{k,1}}{\sum_{i=1}^{k} Df_{i,1}} & \cdots & \dfrac{Df_{k,l}}{\sum_{i=l}^{k} Df_{i,l}} * \log \dfrac{Df_{k,l}}{\sum_{i=l}^{k} Df_{i,l}} \end{bmatrix}$$

In step 1540, an SVD is applied on the Cohesion_Entropy_Occurrence_Matrix as follow: [U, S, V]=svd (Cohesion_Entropy_Occurrence_Matrix,N), where N is the selected dimension. Subsequently, phrase_model=$S^{-1}*U^T$*Cohesion_Entropy_Occurrence_Matrix is calculated.

In step 1545, the cosine distance between each phrase and the preceding one is calculated using the following equation:

$$PDP_{i,i-1} = \frac{\sum_{z=1}^{N} (\text{phrase model}(z, i) * \text{phrase model}(z, i-1))}{\sqrt[2]{\sum_{z=1}^{N} (\text{phrase model}(z, i))^2} * \sqrt[2]{\sum_{z=1}^{N} (\text{phrase model}(z, i-1))^2}}$$

Where $PDP_{i,i-1}$ is the phrase distance between phrase number (i) and phrase number (i−1). At the end a vector $PDP_h$ for each file (h) that can carry the cosine distance between each phrase and the preceding one in this training document.

$$PDP_h = [PDP_{h_{2,1}} PDP_{h_{3,2}} \ldots PDP_{h_{l,l-1}}]$$

Where $PDP_h$ is the phrase distance pattern of file number h; $1 \leq h \leq n$; where "n" is the number of all the training documents. All_Files_Phrases_Patterns is a list that is capable of carrying all of the $PDP_h$ for all of the training documents.

In steps 1550 and 1555, by way of non-limiting example, the variables "unique_words," "Scores," "SVD_Parameters," "Domain_model," "spelling_mistakes_in_each_file," "unique_words_in_each_file," "no_of_unique_words_in_each_file," "Scors_cohesion" and "All_Files_Phrases_Patterns" are saved to a binary file called "SVD_Model."

Figure 20:
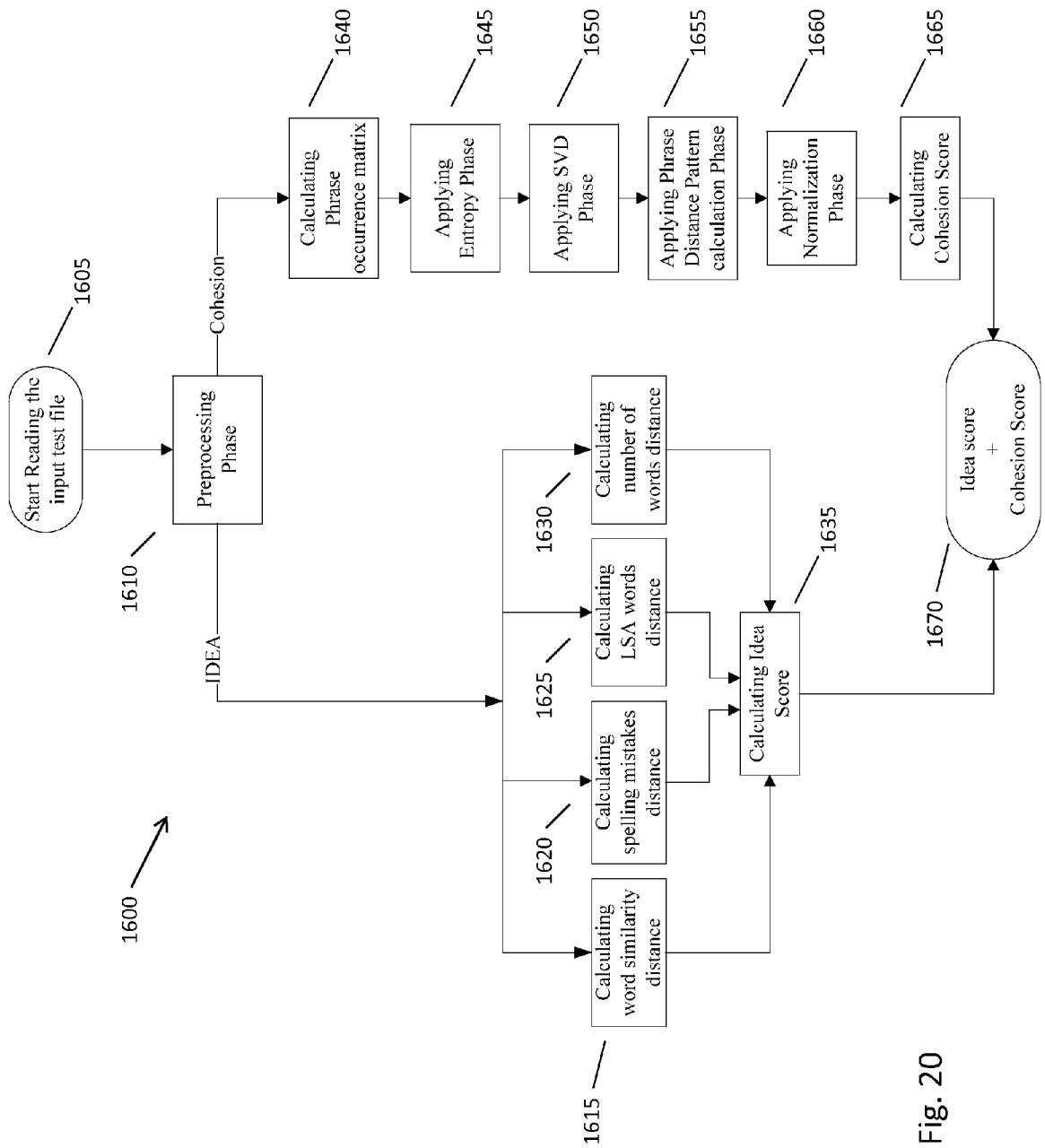
FIG. 20 is a flow diagram of a testing phase of an idea and cohesion scorer process in accordance with aspects of the invention.

The idea and cohesion process continues in the testing phase 1600, which is conducted during the runtime, at step 1605, by providing the input document that is required to be scored for idea and cohesion, as shown in FIG. 20. During a pre-processing step 1610: (1) the "SVD_Model" is loaded, (2) the words of the input document are stored as a variable, by way of non-limiting example, called words_in_file, and (3) the number of spelling mistakes previously calculated in step 130 are stored as a variable, by way of non-limiting example, called file_spelling_mistakes. Thus, after these process steps there are two paths (an idea path and a cohesion path).

Further in step 1610, regarding the idea path, the variables "unique_words," "Scores," "SVD_Parameters," "Domain_model," "spelling_mistakes_in_each_file," "unique_words_in_each_file," "no_of unique_words_in_each_file" and "number_of words_per_each_file" are extracted.

In step 1615, the unique words in the testing file are extracted and stored in a variable, by way of non-limiting example, called "test_file_unique_words." By comparing the "test_file_unique_words" with the all vectors in "unique_words_in_each_file" it is possible to calculate a temp list (1*n) with the following equation:

$$temp = [NMW_1 \ldots NMW_n]$$

Where $NMW_i$ is the number of matched words between the input test file and the training file number "i"; where $1 \leq 1 \leq n$; and where n is the number of training files.

A words similarity distance is then calculated using the following equation where words_similarity=temp/no_of_unique_words_in_each_file:

$$\text{words similarity} = \left[ \dfrac{NMW_1}{NUW_1} \cdots \dfrac{NMW_n}{NUW_n} \right]$$

Where $NUW_i$ is the number of unique in the training file number "i"; where $1 \leq 1 \leq n$; and where "n" is the number of training files.

In step 1620, a spelling mistakes distance is calculated using the following equation where spelling_mistakes_distance=|file_spelling_mistakes_spelling_mistakes_in_each_file|:

spelling_mistakes_distance=|file_spelling_mistakes−[$SM_1 \ldots SM_n$]|

Where $SM_i$ is the number of spelling mistakes in the training file number "i"; where 1≤1≤n; and where "n" is the number of training files.

In step 1625, a LSA distance is calculated. Initially, a frequency list (m*1) is constructed using the following equation:

$$\text{frequency list} = \begin{bmatrix} Tf_{1,1} \\ \vdots \\ Tf_{m,1} \end{bmatrix}$$

Where "m" is the number of unique words in the testing file and each element $Tf_{i,1}$ in the matrix is the frequency of word number "i" in the testing file. Also, where $Tf_{i,1}$ is the frequency of word "i" inside the testing file; and where 1≤1≤m.

Subsequently, the probability of each word inside the input test file is calculated by dividing the frequency list by the sum of all words inside the input test file. The result is then stored in a variable temp using the following equation:

$$temp = \begin{bmatrix} \dfrac{Tf_{1,1}}{\sum_{i=1}^{m} Tf_{i,1}} \\ \vdots \\ \dfrac{Tf_{m,1}}{\sum_{i=1}^{m} Tf_{i,1}} \end{bmatrix}$$

A Entropy_Counts variable is then calculated using the following equation where

Entropy_Counts=(−1)*temp*log(temp); and 0*log(0)=0:

$$\text{Entropy\_Counts} = -\begin{bmatrix} \dfrac{Tf_{1,1}}{\sum_{i=1}^{m} Tf_{i,1}} * \log \dfrac{Tf_{1,1}}{\sum_{i=1}^{m} Tf_{i,1}} \\ \vdots \\ \dfrac{Tf_{m,1}}{\sum_{i=1}^{m} Tf_{i,1}} * \log \dfrac{Tf_{m,1}}{\sum_{i=1}^{m} Tf_{i,1}} \end{bmatrix}$$

An SVD is then applied using the following equation on the Entropy_Counts such that:

Doc_Model=SVD_Parameters*Entropy_Counts:

$$\text{Doc\_model} = \begin{bmatrix} DM_1 \\ \vdots \\ DM_N \end{bmatrix}$$

Where $DM_i$ is the element number "i" in the Doc_Model vector; where 1≤1≤N; and where "N" is the SVD selected dimension during the training phase.

The cosine distance between Doc_Model and all columns in Domain_model are then calculated using the following equation:

$$LSA \text{ Distance} = \begin{bmatrix} \dfrac{\sum_{z=1}^{N}(DM_z * \text{Domain}_{model(z,1)})}{\sqrt[2]{\sum_{z=1}^{N} DM_z^2} * \sqrt[2]{\sum_{z=1}^{N}(\text{Domain}_{model(z,1)})^2}} & \cdots \\ & \dfrac{\sum_{z=1}^{N}(DM_z * \text{Domain}_{model(z,1)})}{\sqrt[2]{\sum_{z=1}^{N} DM_z^2} * \sqrt[2]{\sum_{z=1}^{N}(\text{Domain}_{model(z,1)})^2}} \end{bmatrix}$$

In step 1630, a number of words distance is calculated using the following equation where word_diff=|number_of_words−number_of_words_per_each_file|; where $w_i$ is the number of words in the training file number "i"; where 1≤1≤n; and where "n" is the number of training files.

word_diff=|number_of_words−[$W_1 \ldots W_n$]|

A word_diff_ratio variable is then calculated using the following equation where $$\text{word\_diff\_ratio} = \dfrac{\min(\text{word}_{diff}, \text{number\_of\_words\_per\_each\_file})}{\max(\text{word}_{diff}, \text{number\_of\_words\_per\_each\_file})};$$

where $WD_i$ is the word difference between the input test file and the training file number "i"; where 1≤1≤n; and where "n" is the number of training files:

$$\text{word\_diff\_ratio} = \begin{bmatrix} \dfrac{\min(WD_1, W_1)}{\max(WD_1, W_1)} & \cdots & \dfrac{\min(WD_n, W_n)}{\max(WD_n, W_n)} \end{bmatrix}$$

In step 1635, the idea score is calculated using the following equation:

$$\text{Ratio} = \alpha * \text{word}_{diff_{ratio}} + \beta * \text{words similarity} + \gamma * \text{spelling\_mistakes\_distance} + \varepsilon * LSA \text{ Distance}$$

$$\text{Ratio}^T = \begin{bmatrix} \alpha \dfrac{\min(WD_1, W_1)}{\max(WD_1, W_1)} + \beta \dfrac{NMW_1}{NUW_1} + \gamma SMD_1 + \varepsilon \dfrac{\sum_{z=1}^{N}(DM_z * \text{Domain\_model}(z, 1))}{\sqrt[2]{\sum_{z=1}^{N} DM_z^2} * \sqrt[2]{\sum_{z=1}^{N}(\text{Domain\_model}(z, 1))^2}} \\ \vdots \\ \alpha \dfrac{\min(WD_n, W_n)}{\max(WD_n, W_n)} + \beta \dfrac{NMW_n}{NUW_n} + \gamma SMD_n + \varepsilon \dfrac{\sum_{z=1}^{N}(DM_z * \text{Domain\_model}(z, n))}{\sqrt[2]{\sum_{z=1}^{N} DM_z^2} * \sqrt[2]{\sum_{z=1}^{N}(\text{Domain\_model}(z, n))^2}} \end{bmatrix}$$

Where $SMD_i$ is the spelling mistakes distance between the input test file and the training file number "i"; where $1 \leq l \leq n$; where "n" is the number of training files; and where $\alpha+\beta+\gamma+\epsilon=1$.

A Score Range=[1 ... S] where S is the maximum mark. The idea score is calculated using the following equation:
Idea Score=Score Range (argmin(Ratio)).

Further in step 1610, regarding the cohesion path, the variable "all_files_phrases_patterns" is extracted from the "SVD_Model."

In step 1650, the input test file is split into phrases and a test phrases occurrence matrix (k*1) is constructed using the following equation:

$$\text{Test phrase occurrence matrix} = \begin{bmatrix} TDf_{1,1} & \cdots & TDf_{1,l} \\ \vdots & \ddots & \vdots \\ TDf_{k,1} & \cdots & TDf_{k,l} \end{bmatrix}$$

Where "k" is the number of unique words in the input test file and "1" is the number of phrases in the file and each element TD $f_{i,j}$ in the matrix is the frequency of the word number "i" in the phrase number "j." Also, where TD f, is the frequency of the word "i" inside the phrase "j"; and where $1 \leq l \leq k$; $1 \leq j \leq l$.

In step 1645 the entropy is applied. In particular, the probability of each word inside phrase number "j" is calculated by dividing each column in the previously constructed phrase occurrence matrix by the sum of all words inside phrase "j." The result is then stored in a variable temp using the following equation:

$$temp = \begin{bmatrix} \dfrac{TDf_{1,1}}{\sum_{i=1}^{k} TDf_{i,1}} & \cdots & \dfrac{TDf_{1,l}}{\sum_{i=n}^{k} TDf_{i,l}} \\ \vdots & \ddots & \vdots \\ \dfrac{TDf_{m,1}}{\sum_{i=1}^{k} TDf_{i,1}} & \cdots & \dfrac{TDf_{k,l}}{\sum_{i=n}^{k} TDf_{i,l}} \end{bmatrix}$$

A Test_Cohesion_Entropy_Occurrence_Matrix variable is then calculated using the following equation where Test_Cohesion_Entropy_Occurrence_Matrix=(−1)*temp*log(temp) and 0*log(0)=0:

$$\text{Cohesion\_Entropy\_Occurrence\_Matrix} =$$

$$-\begin{bmatrix} \dfrac{TDf_{1,1}}{\sum_{i=1}^{k} TDf_{i,1}} * \log\dfrac{TDf_{1,1}}{\sum_{i=1}^{k} TDf_{i,1}} & \cdots & \dfrac{TDf_{1,l}}{\sum_{i=l}^{k} TDf_{i,l}} * \log\dfrac{TDf_{1,l}}{\sum_{i=l}^{k} TDf_{i,l}} \\ \vdots & \ddots & \vdots \\ \dfrac{TDf_{k,1}}{\sum_{i=1}^{k} TDf_{i,1}} * \log\dfrac{TDf_{k,1}}{\sum_{i=1}^{k} TDf_{i,1}} & \cdots & \dfrac{TDf_{1,l}}{\sum_{i=l}^{k} TDf_{i,l}} * \log\dfrac{TDf_{k,l}}{\sum_{i=l}^{k} TDf_{i,l}} \end{bmatrix}$$

An SVD is then applied in step 1650 using the following equation where [U, S, V]=svd (Test_Cohesion_Occurrence_Matrix,N); and where N is the selected dimension:
Test_phrase_model=$S^{-1}$*$U^T$*Test_Cohesion_Entropy_Occurrence_Matrix.

In step 1655, the phrase distance pattern calculation phase is applied. The cosine distance between each phrase and the preceding one is calculated using the following equation:

$$TPDP_{i,i-1} = \dfrac{\sum_{z=1}^{N} (\text{Test\_phrase model}(z, i) * \text{Test\_phrase model}(z, i-1))}{\sqrt[2]{\sum_{z=1}^{N} (\text{Test\_phrase model}(z, i))^2} * \sqrt[2]{\sum_{z=1}^{N} (\text{Test\_phrase model}(z, i-1))^2}}$$

Where $TPDP_{i,i-1}$ is the phrase distance between phrase number (i) and phrase number (i−1).

At the end a vector TPDP is used to carry the cosine distance between each phrase and the preceding one in the input test file using the following equation:

$$TPDP=[TPDP_{2,1} TPDP_{3,2} \ldots TPDP_{l,l-1}]$$

In step 1660 a normalization phase is applied using the following equations:

$$\text{normalized } TPDP = \dfrac{TPDP - \text{mean}(TPDP)}{\text{standard deviation}(TPDP)}$$

$$\text{normalized } TPDP = \begin{bmatrix} \dfrac{TPDP_{2,1} - \dfrac{\sum_{i=2}^{l} TPDP_{i,i-1}}{l-1}}{\sqrt[2]{\dfrac{1}{l-1}\sum_{j=2}^{l}\left(TPDP_{j,j-1} - \dfrac{\sum_{i=2}^{l} TPDP_{i,i-1}}{l-1}\right)}} & \cdots & \dfrac{TPDP_{l,l-1} - \dfrac{\sum_{i=2}^{l} TPDP_{i,i-1}}{l-1}}{\sqrt[2]{\dfrac{1}{l-1}\sum_{j=2}^{l}\left(TPDP_{j,j-1} - \dfrac{\sum_{i=2}^{l} TPDP_{i,i-1}}{l-1}\right)}} \end{bmatrix}$$

For each element $PDP_h$ in the "All_Files_Phrases_Pattern" the normalization process is applied using the following equation:

$$\text{normalized } PDP_h = \left[ \frac{PDP_{h_{2,1}} - \frac{\sum_{i=2}^{l} PDP_{h_{i,i-1}}}{l-1}}{\sqrt[2]{\frac{1}{l-1} \sum_{j=2}^{l} \left( PDP_{h_{j,j-1}} - \frac{\sum_{i=2}^{l} PDP_{h_{i,i-1}}}{l-1} \right)}} \cdots \right.$$

$$\left. \frac{PDP_{h_{l,l-1}} - \frac{\sum_{i=2}^{l} PDP_{h_{i,i-1}}}{l-1}}{\sqrt[2]{\frac{1}{l-1} \sum_{j=2}^{l} \left( PDP_{h_{j,j-1}} - \frac{\sum_{i=2}^{l} PDP_{h_{i,i-1}}}{l-1} \right)}} \right]$$

Where $PDP_h$ is the phrase distance pattern of the training file number h; $1 \leq h \leq n$; and where "n" is the number of all training files. The distances between the normalized TPDP and all vectors in normalized $PDP_h$ are then calculated and stored in a variable, by way of non-limiting example, called Coh_Distance.

In step 1665, the cohesion score is calculated where a Score Range=[1 ... S] where S is the maximum mark. The cohesion score is calculated using the following equation: Cohesion Score=Score Range (argmin(Coh_Distance)).

The idea score and the cohesion score are outputted at step 1670 and saved in the invention process/system 100, at steps 175 and 180 in the memory 22a or the storage system 22b, and considered by the Abbir system during the process of generating the final rating of the essay at step 185, as discussed above with regard to FIG. 2.

As discussed above with regard to FIG. 2, in the invention process/system 100, at step 185 a final rating of the essay is automatically generated using the style score from step 115, the punctuation score from step 125, the spelling score from step 135, the quotation score from step 150, the enrichment score from step 154, the syntax analysis score from step 160, the focus score from step 168, the idea score from step 175 and the cohesion score from step 180.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed:

1. A system for rating an input document comprising:
a CPU, a computer readable memory and a computer readable storage media;
first program instructions to:
  provide a style score based on how a language style of an input document is different from at least one training document; and
  determine whether the style score is greater than a predetermined threshold, and when the style score is greater than the predetermined threshold, rejecting the input document;
second program instructions to provide a punctuation score based on a comparison between use of punctuation marks in the input document and the use of punctuation marks in the at least one training document;
third program instructions to provide a spelling score based on spelling accuracy of the input document;
fourth program instructions to provide a quotation score based on a comparison between sentences from the input document and sentences from the at least one training document,
wherein the providing the quotation score comprises dividing the input document into extracted sentences, comparing each of the extracted sentences to the at least one training document, and calculating a percentage of extracted sentences that match the at least one training document;
fifth program instructions to provide an enrichment score based on new and accurate vocabularies used in the input document,
wherein the providing the enrichment score comprises extracting basis words from the input document to obtain a total number of unique words in the input document and dividing the total number of unique words by a total number of words in the input document;
sixth program instructions to provide a syntax analysis score based on grammar mistakes in the input document;
seventh program instructions to provide a focus score based on a topic of the input document and a focus of the input document on that topic;
eighth program instructions to provide an idea and cohesion scores based on whether the input document provides a close or far away cohesive correct answer; and
ninth program instructions to provide the rating of the input document based on the style score, the punctuation score, the spelling score, the quotation score, the enrichment score, the syntax analysis score, the focus score, the idea score and the cohesion score,
wherein the first-ninth program instructions are stored on the computer readable storage media for execution by the CPU via the computer readable memory, and
the rating of the input document is an overall rating or detailed score for the input document that is generated from the style score, the punctuation score, the spelling score, the quotation score, the enrichment score, the syntax analysis score, the focus score, the idea score and the cohesion score.

2. The system of claim 1, wherein the first program instructions further include determining the input document was plagiarized when the style score is greater than the predetermined threshold.

3. The system of claim 1, wherein if the spelling accuracy of the input document is less than a predetermined threshold, then the input document is rejected.

4. The system of claim 1, wherein the third program instructions further include storing a file comprising all misspelled words detected during the process for checking the spelling accuracy of the input document.

5. The system of claim 4, comprising tenth program instructions to correct the misspelled words in the input document.

6. The system of claim 1, further comprising eleventh program instructions to determine correct senses of all words in the input document based on each word position inside a corresponding phrase.

7. The system of claim 6, wherein the sixth program instructions further include using the correct senses of all the words in the input document to determine the grammar mistakes and provide the syntax analysis score.

8. The system of claim 7, wherein the eleventh program instructions further include enabling the system to automatically adjust to newly learned grammar structures.

9. A writing rating method implemented in a computer infrastructure having computer executable code tangibly embodied on a computer readable storage medium including programming instructions operable to rate a writing written in any language, comprising the steps of:
   providing a style score based on how a language style of the writing is different from at least one training document;
   determining whether the style score is greater than a predetermined threshold, and when the style score is greater than the predetermined threshold, rejecting the writing;
   providing a punctuation score based on a comparison between the use of punctuation marks in the writing and the use of punctuation marks in the at least one training document;
   providing a spelling score based on spelling accuracy of the writing;
   providing a quotation score based on a comparison between sentences from the writing and the sentences from the at least one training document,
   wherein the providing the quotation score comprises dividing the writing into extracted sentences, comparing each of the extracted sentences to the at least one training document, and calculating a percentage of extracted sentences that match the at least one training document;
   providing an enrichment score based on new and accurate vocabularies used in the writing,
   wherein the providing the enrichment score comprises extracting basis words from the writing to obtain a total number of unique words in the writing and dividing the total number of unique words by a total number of words in the writing;
   providing a syntax analysis score based on grammar mistakes in the writing;
   providing a focus score based on a topic of the essay and a focus of the writing on that topic;
   providing an idea and cohesion scores based on whether the writing provides a close or far away cohesive correct answer; and
   providing the rating of the writing based on the style score, the punctuation score, the spelling score, the quotation score, the enrichment score, the syntax analysis score, the focus score, the idea score and the cohesion score,
   wherein the rating of the writing is an overall rating or detailed score for the writing that is generated from the style score, the punctuation score, the spelling score, the quotation score, the enrichment score, the syntax analysis score, the focus score, the idea score and the cohesion score.

10. The method of claim 9, wherein providing the style score includes a training phase and a testing phase, and the training phase is performed offline on the at least one training document in order to construct an n-gram list for the at least one training document.

11. The method of claim 10, wherein the testing phase is performed online on the writing in order to construct an n-gram list for the writing, and the n-gram list of the at least one training document is compared to the n-gram list of the writing to provide the style score based on how the language style of the writing is different from the at least one training document.

12. The method of claim 11, wherein providing the style score further includes determining the writing was plagiarized when the style score is greater than the predetermined threshold.

13. The method of claim 9, wherein providing the quotation score includes a training phase and a testing phase, and the training phase is performed offline on the at least one training document in order to index the at least one training document.

14. The method of claim 13, wherein the testing phase is performed online on the writing in order to extract all of the sentences of the writing, and the extracted sentences are compared to the index of the at least one training document to provide the quotation score.

15. The method of claim 14, providing the quotation score further includes determining whether the writing contains too many quotes based on the comparison of the extracted sentences and the index of the at least one training document, and if the writing contains too many quotes, then the writing is rejected.

16. The method of claim 9, further comprising determining correct senses of all words in the writing based on each words position inside a corresponding phrase.

17. The method of claim 16, further comprising using the correct senses of all the words in the writing to determine the grammar mistakes and provide the syntax analysis score.

18. The method of claim 17, enabling the computer infrastructure to automatically adjust to newly learned grammar structures.

19. A computer program product comprising a non-transitory computer usable storage medium having readable program code embodied in the storage medium, the computer program product includes at least one component operable to:
   provide a style score based on how a language style of an input document is different from at least one training document;
   determine whether the style score is greater than a predetermined threshold, and when the style score is greater than the predetermined threshold, rejecting the input document;
   provide a punctuation score based on a comparison between the use of punctuation marks in the input document and use of punctuation marks in the at least one training document;
   provide a spelling score based on spelling accuracy of the input document;
   provide a quotation score based on a comparison between sentences from the input document and sentences from the at least one training document, wherein the providing the quotation score comprises dividing the input document into extracted sentences, comparing each of the extracted sentences to the at least one training document, and calculating a percentage of extracted sentences that match the at least one training document;

provide an enrichment score based on new and accurate vocabularies used in the input document, wherein the providing the enrichment score comprises extracting basis words from the input document to obtain a total number of unique words in the input document and dividing the total number of unique words by a total number of words in the input document;

provide a syntax analysis score based on grammar mistakes in the input document;

provide a focus score based on a topic of the essay and a focus of the input document on that topic;

provide an idea and a cohesion score based on whether the input document provides a close or far away cohesive correct answer; and provide a rating of the input document based on the style score, the punctuation score, the spelling score, the quotation score, the enrichment score, the syntax analysis score, the focus score, the idea score and the cohesion score, wherein the rating of the input document is an overall rating or detailed score for the input document that is generated from the style score, the punctuation score, the spelling score, the quotation score, the enrichment score, the syntax analysis score, the focus score, the idea score and the cohesion score.

20. The computer program product of claim 19, wherein the at least one component is further operable to preprocess the input document to remove all undesired characters and numbers, remove all stop words and reduce words to their stems, base or root in order to minimize processing time and increase accuracy of the rating of the input document.

* * * * *